United States Patent
Soundararajan et al.

(10) Patent No.: US 9,929,998 B1
(45) Date of Patent: Mar. 27, 2018

(54) TAGGED MESSAGES TO FACILITATE ADMINISTRATION OF A VIRTUALIZATION INFRASTRUCTURE

(71) Applicant: VMware, Inc., Palo Alto, CA (US)

(72) Inventors: Vijayaraghavan Soundararajan, Palo Alto, CA (US); Lawrence Spracklen, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 489 days.

(21) Appl. No.: 13/926,721

(22) Filed: Jun. 25, 2013

Related U.S. Application Data

(63) Continuation-in-part of application No. 13/594,605, filed on Aug. 24, 2012, now Pat. No. 9,111,241, and a continuation-in-part of application No. 13/594,633, filed on Aug. 24, 2012, now Pat. No. 9,189,758.

(51) Int. Cl.
   *H04L 12/58* (2006.01)

(52) U.S. Cl.
   CPC .................... *H04L 51/32* (2013.01)

(58) Field of Classification Search
   CPC ...... G06Q 10/107; H04L 12/585; H04L 51/32
   USPC ........................................................ 709/206
   See application file for complete search history.

(56) References Cited

U.S. PATENT DOCUMENTS

| | | | |
|---|---|---|---|
| 5,463,768 A | 10/1995 | Cuddihy et al. | |
| 5,542,047 A | 7/1996 | Armstrong | |
| 6,829,639 B1 | 12/2004 | Lawson et al. | |
| 7,743,332 B2 | 6/2010 | Clark et al. | |
| 7,975,165 B2 | 7/2011 | Shneorson et al. | |
| 8,005,909 B2 | 8/2011 | Raman | |
| 8,234,218 B2 | 7/2012 | Robinson et al. | |
| 8,392,496 B2 | 3/2013 | Linden et al. | |
| 8,438,216 B2 | 5/2013 | Runcie et al. | |
| 8,464,275 B2 | 6/2013 | Surlaker et al. | |
| 8,544,016 B2 | 9/2013 | Friedman et al. | |
| 8,549,002 B2 | 10/2013 | Herter et al. | |
| 8,635,613 B1* | 1/2014 | Vargas et al. ..................... | 718/1 |
| 8,713,165 B2 | 4/2014 | Bharadwaj | |
| 8,825,679 B2 | 9/2014 | Kikin-Gil et al. | |
| 9,043,327 B1 | 5/2015 | Dunagan et al. | |
| 2004/0240462 A1 | 12/2004 | T V et al. | |
| 2005/0188240 A1 | 8/2005 | Murphy et al. | |
| 2006/0117101 A1 | 6/2006 | Lauer et al. | |
| 2007/0239826 A1 | 10/2007 | Ducheneaut et al. | |
| 2008/0098309 A1 | 4/2008 | Fries et al. | |
| 2008/0104172 A1* | 5/2008 | Craig ........................... | 709/204 |
| 2008/0104679 A1 | 5/2008 | Craig | |
| 2008/0229215 A1 | 9/2008 | Baron et al. | |
| 2008/0275979 A1 | 11/2008 | Saba et al. | |
| 2009/0222750 A1 | 9/2009 | Jain et al. | |
| 2009/0300151 A1* | 12/2009 | Friedman et al. ............ | 709/222 |
| 2009/0300502 A1 | 12/2009 | Johnson et al. | |
| 2010/0045697 A1 | 2/2010 | Reville et al. | |

(Continued)

*Primary Examiner* — Dustin Nguyen
*Assistant Examiner* — Javier O Guzman

(57) ABSTRACT

In a computer-implemented method to facilitate administration of a virtualization infrastructure, posted messages of members of a virtualization infrastructure are displayed, wherein the posted messages comprise tags identifying operational conditions of the members of the virtualization infrastructure. Responsive to a selection of a particular tag, the members of the virtualization infrastructure that posted a message comprising the particular tag are displayed.

19 Claims, 26 Drawing Sheets

(56) References Cited

U.S. PATENT DOCUMENTS

| | | |
|---|---|---|
| 2010/0332889 A1 | 12/2010 | Shneorson et al. |
| 2011/0035802 A1 | 2/2011 | Arajujo et al. |
| 2011/0055372 A1 | 3/2011 | Elyashev et al. |
| 2011/0106718 A1 | 5/2011 | Roberts et al. |
| 2011/0185234 A1 | 7/2011 | Cohen et al. |
| 2011/0209145 A1* | 8/2011 | Chen ............... G06F 9/45558 718/1 |
| 2011/0258203 A1 | 10/2011 | Wouhaybi et al. |
| 2011/0289159 A1 | 11/2011 | Delucca et al. |
| 2011/0302569 A1 | 12/2011 | Kunze et al. |
| 2012/0009845 A1 | 1/2012 | Schmelzer |
| 2012/0096352 A1 | 4/2012 | Maor et al. |
| 2012/0117226 A1 | 5/2012 | Tanaka et al. |
| 2012/0154149 A1 | 6/2012 | Trumble |
| 2012/0203899 A1 | 8/2012 | Ganapathy et al. |
| 2012/0209850 A1* | 8/2012 | Kikin-Gil et al. ............ 707/738 |
| 2012/0209908 A1 | 8/2012 | Angelos et al. |
| 2012/0226803 A1* | 9/2012 | Bharadwaj .................... 709/224 |
| 2012/0254284 A1 | 10/2012 | Tamura et al. |
| 2012/0266081 A1 | 10/2012 | Kao |
| 2013/0014033 A1* | 1/2013 | Hamick et al. ............... 715/757 |
| 2013/0014158 A1 | 1/2013 | Bhatia et al. |
| 2013/0066962 A1 | 3/2013 | Scherzinger et al. |
| 2013/0151330 A1* | 6/2013 | Evancich ........... G06Q 30/0201 705/14.41 |
| 2013/0174177 A1 | 7/2013 | Newton et al. |
| 2013/0191464 A1 | 7/2013 | Burckart et al. |
| 2013/0223204 A1 | 8/2013 | Angst et al. |
| 2013/0305169 A1 | 11/2013 | Gold |
| 2013/0311222 A1 | 11/2013 | Chaturvedi et al. |
| 2013/0332922 A1 | 12/2013 | Entezari et al. |
| 2013/0346518 A1 | 12/2013 | Soundararajan et al. |
| 2013/0346519 A1 | 12/2013 | Soundararajan et al. |
| 2013/0346587 A1 | 12/2013 | Barkett et al. |

* cited by examiner

400

```
IDENTIFY AT LEAST A PORTION OF THE MEMBERS OF A VIRTUALIZATION
INFRASTRUCTURE
410

FOR A RESPECTIVE MEMBER OF THE VIRTUALIZATION INFRASTRUCTURE,
    IDENTIFY THE CHILD MEMBERS OF THE RESPECTIVE MEMBER
    412

IDENTIFY WHETHER THE CHILD MEMBERS ARE ACTIVE PARTICIPANTS OF
    THE SOCIAL NETWORK OR PASSIVE PARTICIPANTS OF THE SOCIAL
    NETWORK, WHEREIN THE ACTIVE PARTICIPANTS ARE ABLE TO GENERATE
    A MESSAGE TO A SHARED MESSAGE STREAM OF THE SOCIAL NETWORK
    414
```

IDENTIFY PARENT/CHILD RELATIONSHIPS OF IDENTIFIED MEMBERS OF THE
VIRTUALIZATION INFRASTRUCTURE
420

GENERATE A SOCIAL NETWORK OF THE IDENTIFIED MEMBERS OF THE
VIRTUALIZATION INFRASTRUCTURE BASED ON THE PARENT/CHILD RELATIONSHIPS
430

ESTABLISH AFFILIATION RELATIONSHIPS BETWEEN PARENT MEMBERS AND CHILD
MEMBERS OF THE VIRTUALIZATION INFRASTRUCTURE, WHEREIN THE CHILD
MEMBERS CAN ACCESS SHARED MESSAGE STREAMS CORRESPONDING TO THE
PARENT MEMBERS, SUCH THAT A CHILD MEMBER CAN ESTABLISH AN ASSOCIATION
OF A MESSAGE WITH AN INDICATION THAT THE CHILD MEMBER IDENTIFIES WITH
CONTENT OF THE MESSAGE
440

```
┌─────────────────────────────────────────────────────────────────────┐
│   MAPPING MEMBERS OF THE VIRTUALIZATION INFRASTRUCTURE TO A SOCIAL  │
│                              NETWORK                                │
│                                510                                  │
└─────────────────────────────────────────────────────────────────────┘
                                  │
                                  ▼
┌─────────────────────────────────────────────────────────────────────┐
│  PROVIDE MEMBERS OF A NETWORK WITH ACCESS TO A SHARED MESSAGE STREAM│
│   SUCH THAT THE MEMBERS OF THE NETWORK ARE ABLE TO MONITOR MESSAGES │
│     GENERATED BY OTHER MEMBERS OF THE NETWORK POSTED TO THE SHARED  │
│   MESSAGE STREAM, WHEREIN AT LEAST SOME OF THE MESSAGES ARE INDICATIVE│
│      OF OPERATIONAL CONDITIONS OF PARTICULAR OTHER MEMBERS WHICH    │
│                        GENERATED THE MESSAGES                       │
│                                520                                  │
└─────────────────────────────────────────────────────────────────────┘
                                  │
                                  ▼
┌─────────────────────────────────────────────────────────────────────┐
│    RESPONSIVE TO A FIRST MEMBER OF THE NETWORK IDENTIFYING A SPECIFIC│
│      OPERATIONAL CONDITION OF THE FIRST MEMBER, MONITOR THE SHARED  │
│      MESSAGE STREAM FOR A MESSAGE RELATED TO THE SPECIFIC OPERATIONAL│
│                              CONDITION                              │
│                                530                                  │
└─────────────────────────────────────────────────────────────────────┘
                                  │
                                  ▼
┌─────────────────────────────────────────────────────────────────────┐
│    RECEIVE AN UPDATE TO THE AT LEAST ONE SHARED MESSAGE STREAM WITH AN│
│   INDICATION THAT THE FIRST MEMBER HAS IDENTIFIED THE SPECIFIC OPERATIONAL│
│                              CONDITION                              │
│                                540                                  │
└─────────────────────────────────────────────────────────────────────┘
```

```
┌─────────────────────────────────────────────────────────────┐
│ RECEIVE RESPECTIVE INDICATIONS THAT PARTICULAR MEMBERS OF THE│
│   NETWORK ARE FOLLOWING OTHER PARTICULAR MEMBERS OF THE     │
│                         NETWORK                              │
│                           512                                │
└─────────────────────────────────────────────────────────────┘
                              │
                              ▼
┌─────────────────────────────────────────────────────────────┐
│ RESPONSIVE TO RECEIVING THE RESPECTIVE INDICATIONS, DETERMINE│
│   THAT THE OTHER PARTICULAR MEMBERS OF THE NETWORK ARE      │
│     FOLLOWING THE PARTICULAR MEMBERS OF THE NETWORK         │
│                           514                                │
└─────────────────────────────────────────────────────────────┘
                              │
                              ▼
┌─────────────────────────────────────────────────────────────┐
│ MAINTAIN A MAPPING OF THE MEMBERS, THE MAPPING BASED AT LEAST│
│ IN PART ON THE RESPECTIVE INDICATIONS AND THE DETERMINING THAT│
│ THE OTHER PARTICULAR MEMBERS OF THE NETWORK ARE FOLLOWING   │
│         THE PARTICULAR MEMBERS OF THE NETWORK               │
│                           516                                │
└─────────────────────────────────────────────────────────────┘
```

RECEIVE A MESSAGE COMPRISING A COMMAND, AT A FIRST MEMBER OF A VIRTUALIZATION INFRASTRUCTURE, WHEREIN THE MESSAGE IS COMMUNICATED OVER A SOCIAL NETWORK FROM A SECOND MEMBER OF THE VIRTUALIZATION INFRASTRUCTURE, WHEREIN A PLURALITY OF MEMBERS OF THE VIRTUALIZATION INFRASTRUCTURE ARE MAPPED TO THE SOCIAL NETWORK, SUCH THAT AT LEAST SOME OF THE MEMBERS OF THE VIRTUALIZATION INFRASTRUCTURE ARE ALSO MEMBERS OF THE SOCIAL NETWORK
610

IN RESPONSE TO A DETECTED OPERATIONAL CONDITION, RECEIVE A MESSAGE COMPRISING A COMMAND, AT THE FIRST MEMBER OF THE VIRTUALIZATION INFRASTRUCTURE
611

IN RESPONSE TO A CHANGE IN THE VIRTUALIZATION INFRASTRUCTURE, RECEIVE A MESSAGE COMPRISING A COMMAND, AT THE FIRST MEMBER OF THE VIRTUALIZATION INFRASTRUCTURE
612

RECEIVE THE MESSAGE COMPRISING A COMMAND, AT SOME OF THE PLURALITY OF MEMBERS OF THE VIRTUALIZED INFRASTRUCTURE
613

RECEIVE A PRIVATE MESSAGE COMPRISING A COMMAND, AT THE FIRST MEMBER OF THE VIRTUALIZED INFRASTRUCTURE
614

RECEIVE A MESSAGE COMPRISING A COMMAND, AT A VIRTUAL MACHINE OF THE VIRTUALIZED INFRASTRUCTURE
615

PERIODICALLY POLL FOR THE MESSAGE, AT THE FIRST MEMBER
630

VALIDATE THE COMMAND RECEIVED BY THE FIRST MEMBER OF THE VIRTUALIZATION INFRASTRUCTURE IS ISSUED BY AN ADMINISTRATOR OF THE VIRTUALIZATION INFRASTRUCTURE
640

EXECUTE THE COMMAND BY THE FIRST MEMBER OF THE VIRTUALIZATION INFRASTRUCTURE
650

```
┌─────────────────────────────────────────────────────────────────────┐
│ MONITOR OPERATIONAL CONDITIONS OF MEMBERS OF THE VIRTUALIZATION     │
│ INFRASTRUCTURE, WHEREIN THE MEMBERS OF THE VIRTUALIZATION           │
│ INFRASTRUCTURE ARE MAPPED TO A SOCIAL NETWORK SUCH THAT AT LEAST A  │
│ PORTION OF THE MEMBERS OF THE VIRTUALIZATION INFRASTRUCTURE ARE ALSO│
│ MEMBERS OF THE SOCIAL NETWORK                                       │
│ 910                                                                 │
│  ┌───────────────────────────────────────────────────────────────┐  │
│  │ MONITOR MESSAGES POSTED TO A SHARED MESSAGE STREAM OF THE     │  │
│  │ SOCIAL NETWORK BY MEMBERS OF THE SOCIAL NETWORK ASSOCIATED    │  │
│  │ WITH A MEMBER OF THE VIRTUALIZATION INFRASTRUCTURE            │  │
│  │ 912                                                           │  │
│  └───────────────────────────────────────────────────────────────┘  │
│  ┌───────────────────────────────────────────────────────────────┐  │
│  │ MONITOR OPERATIONAL CONDITIONS IN A LOG FILE PROVIDED BY ONE  │  │
│  │ OF THE MEMBERS OF THE SOCIAL NETWORK                          │  │
│  │ 914                                                           │  │
│  └───────────────────────────────────────────────────────────────┘  │
└─────────────────────────────────────────────────────────────────────┘
                                    │
                                    ▼
┌─────────────────────────────────────────────────────────────────────┐
│ CREATE A GROUP OF MEMBERS OF THE VIRTUALIZATION INFRASTRUCTURE      │
│ WITHIN THE SOCIAL NETWORK BASED AT LEAST IN PART ON THE             │
│ OPERATIONAL CONDITIONS                                              │
│ 920                                                                 │
│  ┌───────────────────────────────────────────────────────────────┐  │
│  │ CREATE A GROUP OF MEMBERS OF THE VIRTUALIZATION INFRASTRUCTURE│  │
│  │ WITHIN THE SOCIAL NETWORK IN RESPONSE TO MONITORING A         │  │
│  │ PRE-DETERMINED NUMBER OF THE HASH TAGS IDENTIFYING THE        │  │
│  │ OPERATIONAL CONDITIONS                                        │  │
│  │ 922                                                           │  │
│  └───────────────────────────────────────────────────────────────┘  │
│  ┌───────────────────────────────────────────────────────────────┐  │
│  │ CREATE A GROUP OF MEMBERS OF THE VIRTUALIZATION INFRASTRUCTURE│  │
│  │ OF THE SOCIAL NETWORK HAVING SIMILAR OPERATIONAL CONDITIONS   │  │
│  │ 924                                                           │  │
│  └───────────────────────────────────────────────────────────────┘  │
└─────────────────────────────────────────────────────────────────────┘

┌─────────────────────────────────────────────────────────────────────┐
│ PRIORITIZE THE GROUP OF MEMBERS OF THE VIRTUALIZATION INFRASTRUCTURE│
│ BASED ON A NUMBER OF THE HASH TAGS IDENTIFYING THE OPERATIONAL      │
│ CONDITIONS                                                          │
│ 930                                                                 │
└─────────────────────────────────────────────────────────────────────┘

┌─────────────────────────────────────────────────────────────────────┐
│ INCREASE VISIBILITY OF THE GROUP OF MEMBERS OF THE VIRTUALIZATION   │
│ INFRASTRUCTURE BASED ON POPULARITY OF THE HASH TAGS FOR PARTICULAR  │
│ OPERATIONAL CONDITIONS                                              │
│ 940                                                                 │
└─────────────────────────────────────────────────────────────────────┘

┌─────────────────────────────────────────────────────────────────────┐
│ SEND A PRIVATE MESSAGE TO A SYSTEM ADMINISTRATOR INDICATING THE     │
│ CREATION OF THE GROUP OF MEMBERS OF THE VIRTUALIZATION INFRASTRUCTURE│
│ 950                                                                 │
└─────────────────────────────────────────────────────────────────────┘
```

```
┌─────────────────────────────────────────────────────────────────────┐
│  MONITOR MESSAGES POSTED TO A SHARED MESSAGE STREAM OF A SOCIAL     │
│   NETWORK BY MEMBERS OF THE SOCIAL NETWORK ASSOCIATED WITH A        │
│  VIRTUALIZATION INFRASTRUCTURE, WHEREIN THE POSTED MESSAGES COMPRISE│
│    HASH TAGS IDENTIFYING OPERATIONAL CONDITIONS OF THE MEMBERS OF THE│
│      VIRTUALIZATION INFRASTRUCTURE, WHEREIN MEMBERS OF THE VIRTUALIZATION│
│  INFRASTRUCTURE ARE MAPPED TO THE SOCIAL NETWORK SUCH THAT AT LEAST A│
│    PORTION OF THE MEMBERS OF THE VIRTUALIZATION INFRASTRUCTURE ARE ALSO│
│                     MEMBERS OF THE SOCIAL NETWORK                   │
│                                1110                                 │
│   ┌─────────────────────────────────────────────────────────────┐   │
│   │  MONITOR OPERATIONAL CONDITIONS IN A LOG FILE PROVIDED BY ONE OF│   │
│   │            THE MEMBERS OF THE SOCIAL NETWORK                │   │
│   │                          1112                               │   │
│   └─────────────────────────────────────────────────────────────┘   │
└─────────────────────────────────────────────────────────────────────┘
                                   │
                                   ▼
┌─────────────────────────────────────────────────────────────────────┐
│   AUTOMATICALLY CREATE A GROUP OF MEMBERS OF THE VIRTUALIZATION     │
│  INFRASTRUCTURE WITHIN THE SOCIAL NETWORK BASED AT LEAST IN PART ON THE│
│                       OPERATIONAL CONDITIONS                        │
│                                1120                                 │
└─────────────────────────────────────────────────────────────────────┘
                                   │
                                   ▼
┌─────────────────────────────────────────────────────────────────────┐
│     SEND A PRIVATE MESSAGE TO A SYSTEM ADMINISTRATOR INDICATING THE │
│         CREATION OF THE GROUP OF MEMBERS OF THE VIRTUALIZATION      │
│                            INFRASTRUCTURE                           │
│                                1130                                 │
└─────────────────────────────────────────────────────────────────────┘
```

DISPLAY MESSAGES POSTED TO A SHARED MESSAGE STREAM OF A SOCIAL NETWORK BY MEMBERS OF THE SOCIAL NETWORK ASSOCIATED WITH A VIRTUALIZATION INFRASTRUCTURE, WHEREIN THE MESSAGES COMPRISE HASH TAGS IDENTIFYING OPERATIONAL CONDITIONS OF THE MEMBERS OF THE SOCIAL NETWORK, WHEREIN MEMBERS OF THE VIRTUALIZATION INFRASTRUCTURE ARE MAPPED TO THE SOCIAL NETWORK SUCH THAT AT LEAST A PORTION OF THE MEMBERS OF THE VIRTUALIZATION INFRASTRUCTURE ARE ALSO MEMBERS OF THE SOCIAL NETWORK
1510

↓

RESPONSIVE TO A SELECTION OF A PARTICULAR HASH TAG, DISPLAY THE MEMBERS OF THE VIRTUALIZATION INFRASTRUCTURE THAT POSTED A MESSAGE COMPRISING THE PARTICULAR HASH TAG
1520

↓

DISPLAY A TAG CLOUD OF THE HASH TAGS, WHEREIN THE HASH TAGS OF THE TAG CLOUD ARE DISPLAYED ACCORDING TO POPULARITY
1530

RESPONSIVE TO A SELECTION OF A PARTICULAR MEMBER OF THE SOCIAL NETWORK, DISPLAY ALL MESSAGES POSTED BY THE PARTICULAR MEMBER
1540

MONITOR PERFORMANCE OF A MEMBER OF A NETWORK BY AN AGENT, WHEREIN MEMBERS OF THE NETWORK ARE PROVIDED WITH ACCESS TO A SHARED MESSAGE STREAM SUCH THAT THE MEMBERS OF THE NETWORK ARE ABLE TO MONITOR MESSAGES GENERATED BY OTHER MEMBERS OF THE NETWORK POSTED TO THE SHARED MESSAGE STREAM
1620

CHECK SYSTEM METRICS OF THE MEMBER
1622

DETERMINE WHETHER THE SYSTEM METRICS ARE WITHIN A DESIRED PERFORMANCE RANGE
1624

STORE A HISTORY OF THE SYSTEM METRICS OF THE MEMBER
1626

RESPONSIVE TO THE AGENT IDENTIFYING A SPECIFIC OPERATIONAL CONDITION OF THE MEMBER, MONITOR THE SHARED MESSAGE STREAM FOR A MESSAGE RELATED TO THE SPECIFIC OPERATIONAL CONDITION
1630

WITH RESPECT TO A SPECIFIC MESSAGE MONITORED AT THE MEMBER, A RELEVANCE OF THE INDICATED OPERATIONAL CONDITION OF THE SPECIFIC MESSAGE TO THE MEMBER IS DETERMINED, THE RELEVANCE BEING BASED ON COMPATIBILITY OF THE INDICATED OPERATIONAL CONDITION TO THE SPECIFIC OPERATIONAL CONDITION
1632

IN RESPONSE TO DETERMINING THAT THERE IS COMPATIBILITY OF THE INDICATED OPERATIONAL CONDITION TO THE SPECIFIC OPERATIONAL CONDITION, DETERMINE THAT THE SPECIFIC MESSAGE IS RELATED TO THE SPECIFIC OPERATIONAL CONDITION
1634

FIG. 16A

TAGGED MESSAGES TO FACILITATE ADMINISTRATION OF A VIRTUALIZATION INFRASTRUCTURE

CROSS-REFERENCE TO RELATED APPLICATIONS

This application is a Continuation-in-Part of, and claims priority to and the benefit of, co-pending U.S. patent application Ser. No. 13/594,605, filed on Aug. 24, 2012, entitled "CREATION OF A SOCIAL NETWORK OF MEMBERS OF A VIRTUALIZATION INFRASTRUCTURE," by Soundararajan et al., and assigned to the assignee of the present application, and U.S. patent application Ser. No. 13/594,633, filed on Aug. 24, 2012, entitled "ADMINISTRATION OF A NETWORK," by Soundararajan et al., and assigned to the assignee of the present application.

This application is related to co-pending U.S. patent application Ser. No. 13/926,509, filed on Jun. 25, 2013, entitled "COMMUNICATING MESSAGES OVER A SOCIAL NETWORK TO MEMBERS OF A VIRTUALIZATION INFRASTRUCTURE," by Soundararajan et al., and assigned to the assignee of the present application, is related to co-pending U.S. patent application Ser. No. 13/926,819, filed on Jun. 25, 2013, entitled "CREATING A GROUP OF MEMBERS BASED ON MONITORING A SOCIAL NETWORK," by Soundararajan et al., and assigned to the assignee of the present application, and is related to co-pending U.S. patent application Ser. No. 13/926,878, filed on Jun. 25, 2013, entitled "ADMINISTRATION OF A MEMBER OF A NETWORK," by Soundararajan et al., and assigned to the assignee of the present application.

BACKGROUND

Administration of virtualization infrastructures, such as virtual datacenters, is increasingly complex. One of the biggest challenges in virtualized deployments is keeping track of the basic health of the infrastructure. Administrators would like to quickly be informed when problems occur and would also like to have guidance about how to solve issues when they arise. These problems are frequently exacerbated as the virtualized deployments increase in scale. Conventional means for monitoring these large environments typically focus on aggregating and summarizing the amount of data to manageable quantities. Reducing this data is typically challenging, in that both identifying serious issues in the virtualization and intelligent data visualization techniques are valuable.

Automated techniques for monitoring the health of virtualization infrastructure have become increasingly prevalent and helpful. Such approaches typically leverage the collection and analysis of a large number of metrics across an environment in order to provide a concise, simplified view of the status of the entire environment. However, despite the success of such tools, significant amounts of training is often still required in order to obtain to obtain proficiency at understanding and using the output of such tools.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 4A-4D are flow diagrams of example operations of a method for creating a social network of members of a virtualization infrastructure, according to various embodiments of the present invention.

FIGS. 5A-5F are flow diagrams of example operations of a method for facilitating administration of a network of members, according to various embodiments of the present invention.

FIGS. 6, 7 and 8 are flow diagrams of examples operations of methods for communicating messages over a social network to members of a virtualization infrastructure, according to various embodiments of the present invention.

FIGS. 9, 10, and 11 are flow diagrams of examples operations of methods to facilitate administration of a virtualization infrastructure, according to various embodiments of the present invention.

FIGS. 13, 14, and 15 are flow diagrams of examples operations of methods to facilitate administration of a virtualization infrastructure, according to various embodiments of the present invention.

FIGS. 16A and 16B are a flow diagram of a method for facilitating administration of a member of a network, according to various embodiments of the present invention.

DESCRIPTION OF EMBODIMENTS

Figure 1:
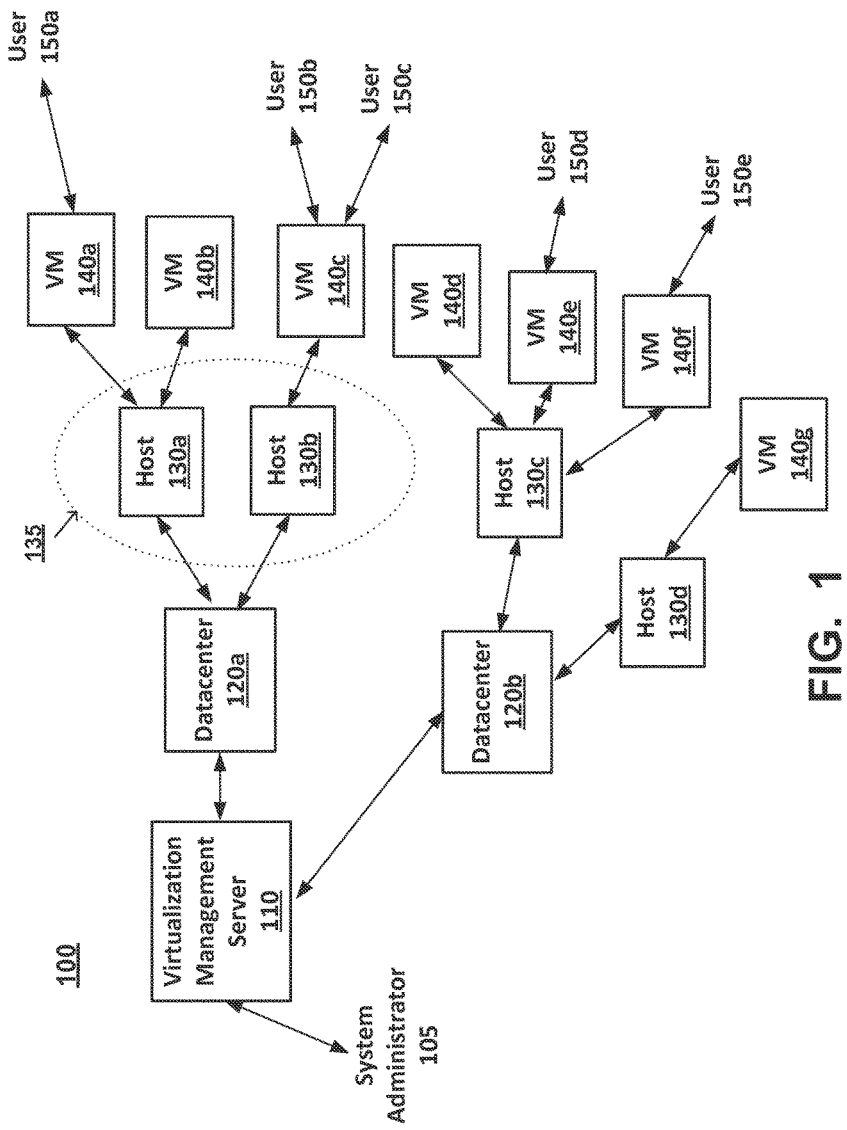
FIG. 1 illustrates an example network upon which embodiments of the present invention can be implemented.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving," "executing," "validating," "polling," "broadcasting," "generating," or the like, often refer to the actions and processes of an electronic computing device or system, such as a virtualization management server or a virtual machine (VM), among others, of a virtualization infrastructure. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, the administration of virtualization infrastructures is a complex endeavor. A typical virtualization administrator may be responsible for the management of hundreds of hosts and thousands of VMs. Typically, virtualization administrators are reliant on virtualization administration tools that provide a plethora of information. However, it is often difficult to distill this information into a manageable form due to the large scale of many virtualization deployments.

At least some embodiments of the present invention provide for the creation of a social network of members of a network of members. For instance, where the network is a virtualization infrastructure, the members of the virtualization infrastructure are mapped into a social network based on the parent/child relationships of the members. Affiliation relationships are established between parent members and child members of the virtualization infrastructure, allowing members to "follow" other members.

At least some embodiments of the present invention utilize social networking between members of the virtual infrastructure to provide aggregated and summarized management data to an administrator. In various embodiments described herein, a virtualized environment is mapped into a social network. For example, members of the social network may include, without limitation, human members, such as system administrators and VM users, and non-human members such as hosts, VMs, and administration servers. Members of the virtualization infrastructure are able to contribute status updates to a shared message stream. Members are also able to monitor the shared message stream for messages related to specific operational conditions identified by the individual members. If the shared message stream includes a message related to the detected operational condition, members can associate an indication with a message that the specific operational condition has been detected by a particular member. In one embodiment, the message is weighted according to the number of indications associated with the message (e.g., "likes) by other members of the network.

In accordance with various embodiments, the social network is arranged according to a hierarchy of the virtualized environment, such that information having a sufficient level of importance is directed to a system administrator atop the hierarchy. For instance, if a sufficient number of members associate indications of a detected operational condition with a member, the message is forwarded to a system administrator. In various embodiments, a command is performed in response to a system administrator posting an administrative message to a shared message board. Embodiments of the present invention, by combining the reduction of information with the ability to perform basic virtualization management operations in response to such information within the context of a social network, provides an intuitive, platform-independent system for the creation, monitoring, and management of a virtualized environment.

Discussion begins with a description of a comparison of virtualization infrastructures to social networks. Creation of a social network based on the members of the network is then described. Monitoring and management of the members of the social network is then described. Operation of various processes of involved in the creation of the social network and the management of the members of the social network are then described, including examples of creating a social network for members of a virtualization infrastructure, and monitoring the operation of the members of the virtualization infrastructure.

Comparison of Virtualization Infrastructures to Social Networks

FIG. 1 illustrates a virtualization infrastructure 100 upon which embodiments of the present invention can be implemented. Virtualization infrastructure 100 may be used, for example, to provide hardware virtualization enterprise services. Virtualization infrastructure 100 includes various network nodes working in tandem to provide virtualization. As illustrated, virtualization infrastructure 100 includes virtualization management server 110, datacenters 120a and 120b, hosts 130a-d, and VMs 140a-g. It should be appreciated that virtualization infrastructure 100 may include any number of virtualization management servers, datacenters, hosts, and VMs, and that the number of components shown in FIG. 1 is for illustrative purposes only.

It should be appreciated that virtualization infrastructure 100 includes physical members and logical groups. As FIG. 1 illustrates, virtualization management server 110 includes datacenter 120a, which in turn includes hosts 130a and 130b. Hosts 130a and 130b also are members of cluster 135. Cluster 135 includes VMs 140a-c. In one embodiment, the hierarchy of virtualization infrastructure 100 can be mapped to a social network. In other embodiments, system administrator 105 and users 150a-e are humans that interact with virtualization management server 110.

For example, members of virtualization infrastructure 100 can establish affiliation relationships with other members. For purposes of the instant application, an affiliation relationship refers to a connection between two members of virtualization infrastructure 100 in which each of the members of the affiliation relationship have the ability to receive and monitor each other's status. For example, in Socialcast®, the affiliation relationship is referred to as "following." In other social network applications, the affiliation relationship may refer to "friends" or "connections." It should be appreciated that while different terms may be used to describe an affiliation relationship, an affiliation relationship generally affords its members privileges regarding the access of and commenting on the status of its members, and that these terms can be used interchangeably.

Continuing with the example, a system administrator 105 can "follow" virtualization management server 110. In turn, virtualization management server 110 can follow hosts 130a and 130b. Host 130a can follow VMs 140a and 140b, and host 130b can follow VM 140c. It should be appreciated that the hierarchy provides a manner for limiting information flow.

Figure 2:
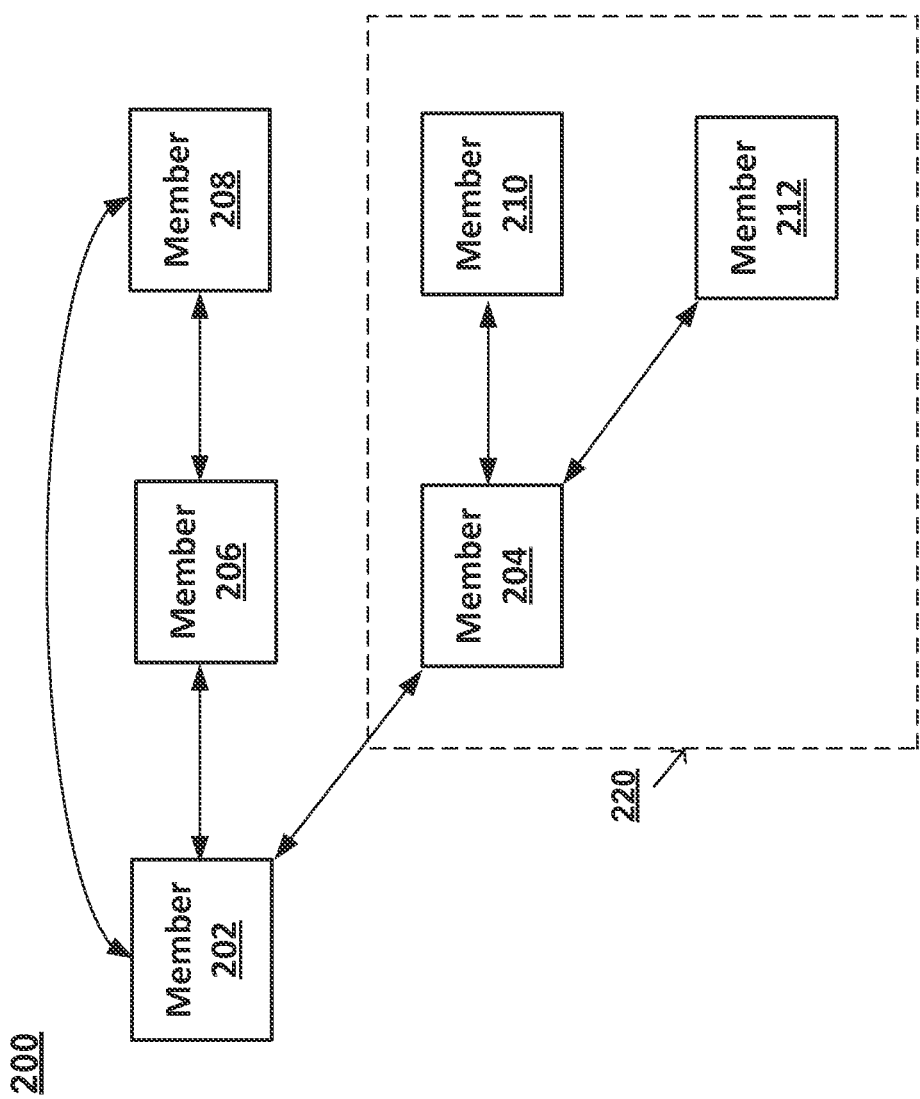
FIG. 2 illustrates an example social network, according to various embodiments of the present invention.

FIG. 2 illustrates an example social network 200, according to various embodiments of the present invention. For purposes of the description of FIG. 2, a two-way arrow suggests an affiliation relationship (e.g., a friend relationship or a following relationship). For example, member 202 is friends with member 204 and member 204 is friends with member 212, but member 212 is not friends with member 202. In addition, member 204, 210 and 212 might choose to create a separate, private group 220. It should be appreciated that there is a distinction between physical entities, namely the members of social network 200, and the logical entities, such as group 220. It should be appreciated that the actions of various non-human members of the social network, e.g., "choosing" and similar operations, are defined programmatically and executed by the member.

In a social network, member 202 may choose instead to only be friends with member 204, knowing that if anything interesting happens to members 210 and 212, that member 204 will likely collect such information and share it with member 202. In a similar manner, with reference to FIG. 1, virtualization management server 110 need not choose to be friends with all VMs 140a-g, but just with hosts 130a-d. If a host receives enough status updates from the VMs running on it, it may choose to signal a status change to virtualization management server 110. In a similar way, system administrator 105 may choose to be friends only with virtualization management server 110, knowing that virtualization management server 110 can accumulate status updates and propagate them to system administrator 105.

It should be appreciated that datacenters, clusters, and resource pools are not included as having affiliation relationships in a social network of a virtualization infrastructure, because they do not have a physical manifestation. In other words, while system administrator 105 can send and receive network packets to/from VMs and hosts, system administrator 105 cannot send a message to a datacenter. Instead, a datacenter, cluster, resource pool, and host/VM folders are more similar to a group in a social network. However, it should be appreciated that a datacenter, as well as clusters, might be associated with other components, such as processors and controllers that might be able to send or receive messages. It should also be appreciated that datacenters and clusters may have a physical manifestation. It should also be appreciated that the notion of a group can also refer to user-defined collections of member. For example, it may be helpful to put all VMs that run a particular application in a given group, or it might be helpful to put all VMs under a given resource pool in a given group.

Creation of a Social Network

Figure 3:
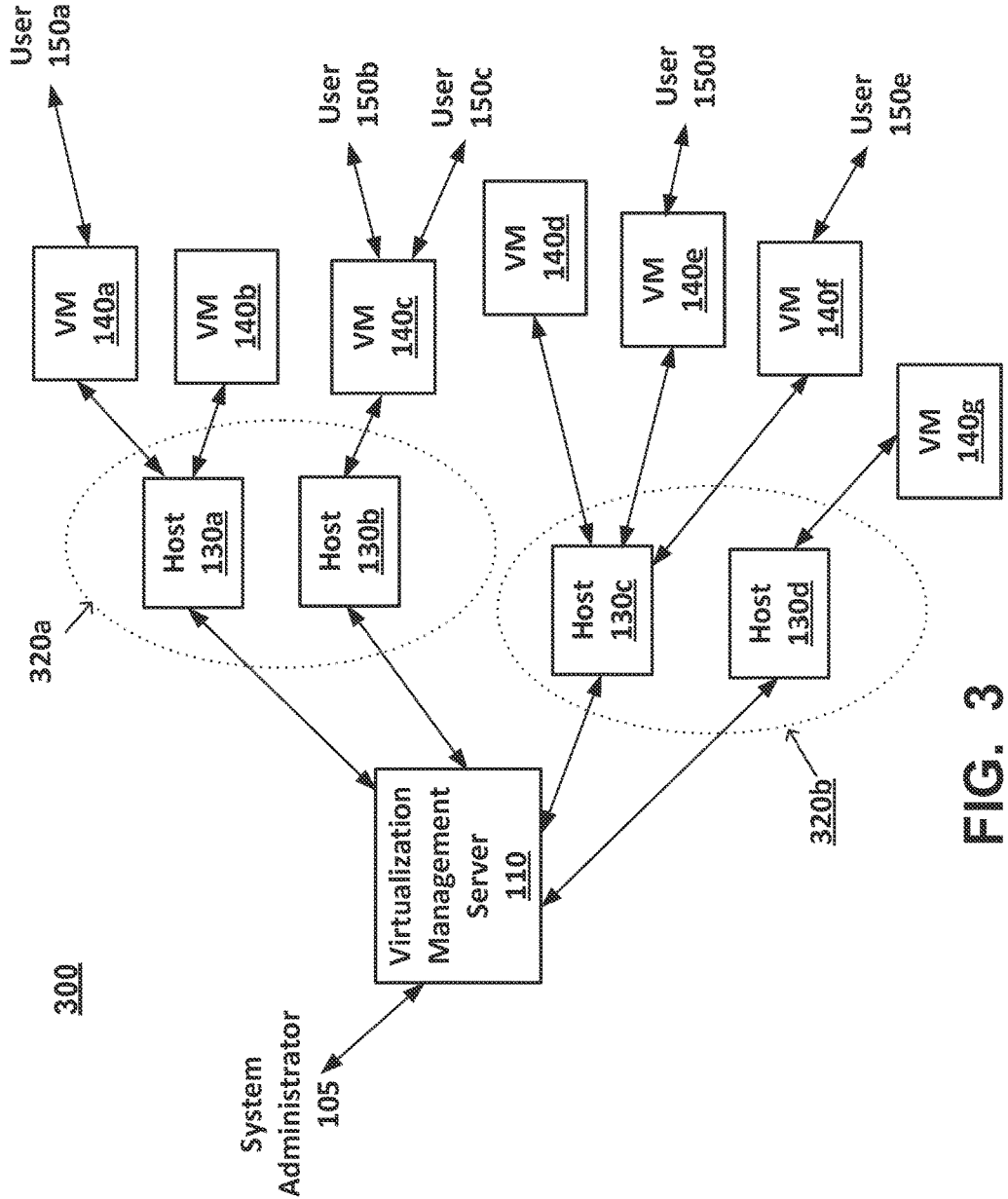
FIG. 3 illustrates an example social network based on a virtualization infrastructure, according to various embodiments of the present invention.

At least some embodiments of the present invention provide for creating a social network of members of a virtualization infrastructure. FIG. 3 illustrates an example social network 300 based on a virtualization infrastructure, according to various embodiments of the present invention. Social network 300 is populated with members of virtualization infrastructure 100.

At least a portion of the members of the virtualization infrastructure are identified at a virtualization infrastructure manager. In one embodiment, virtualization management server 110 is able to start at any node (e.g., member) of virtualization infrastructure 100 and locate all children of that node. In one embodiment, the virtualization management server 110 allows for the specification of the type of children to be located. For example, virtualization management server 110 may be directed to select all VMs within a datacenter (e.g., VMs 140a-c of datacenter 120a). It should be appreciated that these children do not have to be the immediate children with a datacenter. For example, with reference to FIG. 1, given the identification of the datacenter (e.g., datacenter 120a) and the identification of the type as "Virtual Machine," VMs 140a-c would be identified. In one embodiment, the parent-child relationships are in accordance with the VMware Virtual Infrastructure Management (VIM) API, also referred to as the vSphere API.

As presented above, note that some children are not active participants in a social network. For example, a cluster is typically a logical construct, not a physical one, since a cluster itself might not be able to send/receive a message. In contrast, a host or VM can send/receive messages. In one embodiment, a member is pinged to determine whether it is an active participant in the social network. For purposes of the instant application, active participants refer to members that can send/receive messages and passive participants refer to members that are not able to send/receive messages themselves.

Upon identifying the parent/child relationships of the members of virtualization infrastructure 100, social network 300 is generated having the hierarchy of virtualization infrastructure 100. Affiliation relationships between the parent and child members of virtualization infrastructure 100 are established (e.g., follower/followee relationships or friend relationships). For example, host 130c follows its VMs 140d-f, and users 150d and 150e follow VMs 140e and 140f, respectively. In addition, virtualization management server 110 follows hosts 130a-d. Moreover, hosts 130a-d can join groups corresponding to their datacenters, such that hosts 130a and 130b are in group 320a corresponding to datacenter 120a. Similarly, hosts 130a-d can join groups without corresponding datacenters, e.g., hosts 130c and 130d are in group 320b. It should be appreciated that many different types of groups may be used in accordance with the described embodiment. For example, clusters can include hosts (or VMs), resource pools can include VMs. In another example, a parent member can be a group, e.g., host X following VMs Y, N, and Z, and can have a separate group called "Host X" in which VMs Y, N, and Z are members. Furthermore, special groups are also available, e.g., VMs running particular applications are grouped together. For example, group 320c might represent VMs 140d and 140e running a particular application.

VMs 140a-g are able to post to shared message streams of a group corresponding to their parent host. In one embodiment, the child members can access shared message streams corresponding to the parent members, such that a child member can establish an association of a message with an indication that the child member identifies with content of the message, e.g., can "like" the message.

In various embodiments, the social network affiliation relationships are updated in response to a member being removed from or being added to virtualization infrastructure 100. In one embodiment, the social network affiliation relationships are updated in response to a member moving with virtualization infrastructure 100, e.g., a vMotion® has occurred. For example, when a VM moves from one host to another host, virtualization management server 110 detects the movement. Responsive to the VM moving, the affiliation relationships are updated such that the source host "unfollows" the VM and the destination host "follows" the VM.

Various embodiments of the present invention can be implemented using Socialcast®, a social network platform providing sophisticated messaging between members of the social network. The following is a brief description of social media messaging in Socialcast®. There are several kinds of messages in Socialcast®. There are community streams, in which a group of members subscribe to a given topic and see messages related to that topic. There are also private messages, which are messages directed to a particular member and not viewable by other members. There are comments, in which members can respond to existing stream messages, and there are private message replies, which are similar to comments, but are responses to private messages. Messages and comments can be liked (in which other members express approval) or un-liked (in which other members express disapproval). Messages can be tagged with categories or filtered by content. Finally, members can be followed: if member A is followed by member B, then when member A makes comments, member B is notified of them. This allows member B to be aware of the status of member A.

Based on this description of the message types in Socialcast®, the following describes portions of the Socialcast® API:

1. Messages API: The messages API allow a member to read a single stream message or a group of stream messages, create new messages, update new messages, destroy messages, and search messages. A member can also specify the retrieval of messages since a certain date, the retrieval of messages that fit certain criteria, etc.
2. Likes API: The likes API allows a member to like a message or un-like a message
3. Comments API: The comments API allows a member to retrieve comments, create comments, update comments, or delete comments. There is also a "comment likes" API where a member can like or un-like a comment.
4. Flagging API: The flagging API allows messages to be flagged (and un-flagged)
5. Private Messages API: The private messages API allows a member to perform all of the same actions as in the standard messages API, but for private messages.
6. Users API: The members API allows a member to retrieve information about other members, search for members, deactivate members, and retrieve messages from a specific member.
7. Follow/Unfollow API: The follow API allows users to "follow" other members (e.g., see comments or notifications by the other members).
8. Groups API: The groups API allows members to list groups, the members of groups, and group memberships of a given member.
9. Attachments API: The attachments API allows a member to create attachments (either separately or as part of a message).

In one embodiment, the above-referenced commands are Hypertext Transfer Protocol (HTTP) GET or POST requests. Installing a library such as libCurl in VMs enables the VMs to programmatically send status and receive status. Adding this library to a host further enables a host to send and receive status. The ability to programmatically interact with messages, groups, etc., allows the hosts and VMs be members in the virtualization social network in the same way that human beings are members of the virtualization social network. Embodiments of the present invention can also be implemented using other programming languages, such as Perl, Python or Ruby.

In one embodiment, an agent is installed as a service/daemon that starts running as soon as the operating system (OS) of a member starts. At initialization the agent retrieves a unique identifier that can be used to uniquely identify the OS to Socialcast®. For instance, the unique identifier can be the Media Access Control (MAC) address. The Socialcast® server is queried (e.g., using the MAC address as its Socialcast® username) to determine necessary configuration information, including internal Socialcast® identifiers and groups and streams to which the agent should monitor/post. It should be appreciated that alternatives to the MAC address can be used. For example, the universally unique identifier (UUID) for a VM can be used, as the UUID uniquely identifies the VM among all other VMs. In one embodiment, it is determined if there are special virtualization applications running for which additional monitoring can be performed. In the present embodiment, the Socialcast® profile photo is updated based on the operating system and applications that are running, as well as the entity type. For example, a host would have a different profile photo (e.g., icon) from a VM.

In one embodiment, the Internet Protocol (IP) address of the Socialcast® server is hardcoded in the VMs. However, it should be appreciated that the IP address of the Socialcast® server can be included in a VM when the VM is deployed. Moreover, in one embodiment, users are created in Socialcast® using the MAC address of the associated members as the username and email. For example, a VM wakes up and logs into Socialcast® using its MAC address. The Socialcast® server sends a private message to the VM that contains the VM's Socialcast® identifier (ID). Once the VM receives its Socialcast® ID, the Socialcast® ID can be used in all future correspondence (e.g., posting public messages, sending messages to groups, etc.) using Socialcast®. As described herein, in one embodiment, the initial login to the Socialcast® server only requires a member's MAC address and a password, rather than the Socialcast® ID. The Socialcast® server can send the Socialcast® ID over the private message channel to provide a member with its Socialcast® ID.

Monitoring and Management of the Members of the Social Network

Embodiments of the present invention facilitate administration of a network of members. While the embodiments described herein are directed toward monitoring a social network of members of a virtual infrastructure, it should be appreciated by one of skill in the art that the described embodiments are not limited as such. In particular, embodiments of the present invention may be used to facilitate the management of any network of members for which messaging between members is available.

As described herein, embodiments of the present invention combine management of a virtualization infrastructure with a social network platform, providing intuitive virtualization infrastructure management. The virtualization infrastructure is organized into a social network, including both human members, such as system administrators and user, and non-human members, such as virtualization management servers, hosts and VMs. Members of the social network are able to contribute status updates, whether manually (e.g., human members) or programmatically (e.g., via automated scripts running on VMs and hosts). The social network is organized according to the hierarchy in a virtualized infrastructure, enabling the limiting of information flow so that only important or relevant updates reach a system administrator. Moreover, in various embodiments, the system administrator is capable of performing commands within the social network.

As described above with reference to FIG. 3, a system administrator 105 joins social network 300 and "follows" a virtualization management server 110 to receive timely updates about the status of the virtualization infrastructure. Virtualization management server 110 executes social network agent that allows it to "follow" hosts and their status updates. This agent uses the messaging capabilities of the social network platform, such as Socialcast® (e.g., posting messages to lists, deleting messages from lists, sending replies in response to messages, etc.) to apprise system administrator 105 of useful events. Similarly, hosts 130a-d include a similar social network agent and can "follow" VMs and be organized into groups (e.g., clusters), and VMs can be organized into groups based on application type, such as applications running on the VMs or VMs belonging to a particular user.

By creating a hierarchy from a system administrator to the host to the VM, and allowing each to post status updates to relevant communities, a system administrator can stay informed about the status of a datacenter. By utilizing message capabilities, system administrators can even send commands to hosts or VMs. Moreover, by configuring the types of status that are sent, and the data source for status updates, and by allowing rich uniform resource locators (URLs) in messages for checking status, a system administrator can do first-level triaging of issues in a large virtualized environment.

Members of a network are provided with access to a shared message stream, such that the members of the network are able to monitor messages generated by other members of the network posted to the shared message stream. At least some of the messages are indicative of operational conditions of particular other members which generated the messages. In response to a first member of the network identifying a specific operational condition of the first member, the shared message stream is monitored for a message related to the specific operational condition. Provided the shared message stream includes a message related to the specific operational condition identified by the first member, an association of the message with an indication that the first member identifies with the specific operational condition is established (e.g., the first member "likes" the message), wherein the first member is configured to establish the association.

If important events (e.g., operational conditions) occur, notifications are sent to a system administrator. These notifications are acknowledged and then cleared by the system administrator. Multiple similar issues may happen among a group of hosts or VMs, suggesting a common root cause. Messages can be flagged according to severity, and messages with common headers can be additionally categorized.

As illustrated in FIG. 3, a system administrator 105 follows virtualization management server 110, which in turn follows hosts 130a-d, which in turn follow VMs 140a-g, respectively. In various embodiments, were hosts are arranged in clusters, a set of hosts might be organized into a group named after the parent cluster. VMs may reside in folders or resource pools, so VMs may be placed in groups based on parent folder or resource pool. It should be appreciated that various types of groupings are available, and not limited to the described embodiments. For example, physical hosts that belong in rack X can go into a group named X, or every VM running Microsoft Exchange can go into a group named "Microsoft Exchange." A system administrator might decide to join such a group of VMs.

For instance, when a VM encounters an issue like a virtual hard drive running out of space, the VM can perform an HTTP POST request to indicate its status (e.g., "ERROR: VM hard drive out of space") using the messages API. In the present embodiment, a custom stream has been created, and when a message is sent to virtualization management server 110, the message is parsed. Because the message is from a "VM" and contains "hard disk" in the error message, the message is automatically redirected to the "VM hard disk" shared message stream. If a system administrator is periodically watching updates to this stream, he might notice a flurry of activity and choose to investigate the VM hard disks in his infrastructure. Alternatively, a host can have an agent running that automatically reads messages to a given stream, parses them, and performs certain actions as a result.

Blindly sending messages to a stream can result in an unmanageable quantity of messages to a human. To avoid such issues, a feature of the Socialcast® API is utilized: the ability to read a stream before publishing to it. For instance, if several VMs are exhibiting the same issues (e.g., hard drive failures), rather than each posting to the same stream and inundating an administrator with messages, the Socialcast® agent on each VM can programmatically read the public stream and find out if such a message already exists. If so, the VM can "like" the message instead of adding a new message to the stream. In this manner, a system administrator that is subscribed to this group will not be overwhelmed with messages: instead, the administrator will see a single error message with a large number of "like" messages. This may suggest to the administrator that something is seriously wrong with some shared resource associated with these VMs.

Similarly, consider a host that is following each of its VMs. The host can use a simple loop to poll for status updates by its VMs. When enough such ERROR messages are detected, the host might decide to post an aggregated "ERROR: VM disk failures" to its status. The virtualization management server that is following this host may then choose to update its status accordingly ("ERROR: HOST X shows VM disk failures"). The system administrator, who is following this virtualization management server, will then see the appropriate status notification and may decide to investigate the host. By utilizing the hierarchical propagation of messages, a system administrator sees a greatly reduced set of error messages. The system administrator may further decide to create a special group called a "cluster," and put all hosts in that cluster in a group. The system administrator may choose to occasionally monitor the messages in the cluster group. By seeing all messages related to the cluster in one place, the system administrator may notice patterns that would not otherwise be obvious. For example, if the cluster group shows a single "host disconnect" message and a number of "likes" for that message from the other hosts, it might be the case that a power supply to a rack containing these hosts has failed, and all hosts are subsequently disconnected. Note here that the ability to read the group messages before publishing is crucial to reduce the number of messages: instead of publishing a new message, the "like" attribute is used. Depending on the type of power supply (managed or not), the power supply itself may be able to join a given social network of hosts and VMs and emit status updates.

As yet another technique for reducing information, a host or virtualization management server may utilize flags. For example, depending on the content of the messages (e.g., error messages or warning messages), a host that is following its VMs may examine a message stream, choose the messages with errors, and flag them, indicating that they are of particular importance. The host can later programmatically examine flagged messages and send a single update to the virtualization management server. The virtualization management server, in turn, can notify the system administrator with a single message.

It should be appreciated that messages do not have to be limited to static read-only content. For example, perhaps a system administrator sends a private message to a VM that includes the body of a script. When the VM reads the message, it can execute the script. Similar such commands can be sent to hosts. For example, a primitive heartbeat mechanism can also be implemented: if each VM and host is configured to send a message once a day, and if a host periodically checks to see if each VM has issued an update, the host can potentially detect if a VM has gone offline. The host could then send itself a command to power on the VM, and if no response is detected from the VM, a message can be posted by the host to the administrator's group. To prevent security issues with malicious users sending arbitrary commands to hosts and VMs, it can be implemented that only authorized community members and members of a given group (e.g., an administrators group for system administrators) are allowed to send messages to other members.

It should be appreciated that a system administrator can periodically flush old messages or messages that have been acknowledged and acted upon. Messages can be searched, providing a helpful audit trail.

In one embodiment, where an agent is installed on a member, while monitoring the performance of the member, the agent periodically awakes and performs a system health check and reports any anomalies.

The agent checks to see if the agent has been sent any new messages. These can include messages informing the agent to monitor/subscribe to different groups/streams (e.g. if a vMotion® occurred), or even, if the administrative privileges of the messages are sufficient, perform specified operations. The specified operations can include a shutdown request, a variety of predefined monitoring operations (e.g., report the processes using the most memory), or arbitrary queries on the system. For example, for Windows systems, the Windows Management Instrumentation (WMI) interface is used to query the OS about system health. WMI supports a SQL-like query language, which can allow users to provide arbitrary queries to the agent that, in turn, the agent will run on demand and post the results to Socialcast®.

The agent can check key system metrics (including processor use, disk use and memory use) and ensure they are all within the normal healthy range. The agent keeps a running history of these metrics and adds the latest values of these metrics to agent's history buffers that are used to identify trends in the metrics and enable the agent to post plots to Socialcast® illustrating performance over a most recent time period. The agent can also check the Windows event logs to determine that no errors have been reported. The agent can check for any updates to log files for the virtualization management server (e.g., VMware vCenter™) and parse for new problems. The agent also checks that key applications are still running.

If the agent detects any problems, Socialcast® is queried to determine if this problem has already been reported in any of the groups/streams that the agent is monitoring. The agent determines which problems should be reported to which group and searches the appropriate groups for reported problems. Also, messages sent to Socialcast® by the agent include hash tags that allow the agent to perform more accurate and less computationally expensive search operations. The other benefits of the hash tags are that they provide the Socialcast® administrator significant additional insight into the trending behavioral problems of the datacenters they are monitoring. There may be one or more hash tags per message, to provide a wealth of information.

If a similar problem has already been reported to Socialcast®, the agent will "like" that existing post. If no such problem has been reported, the agent will report the problem—submitting the message to the appropriate group/stream and adding a meaningful hash tag to the message body. The agent uses generic message titles and provides additional details in the message body. The agent performs its search operations on the message title. In essence, the agent will query Socialcast® and request Socialcast® provide the agent with all messages submitted to particular group/stream, containing a particular hash tag, in the most recent time period. The agent then performs additional parsing on the messages provided by Socialcast® to determine whether there is a good match. When the agent posts a message it can upload a chart to the Socialcast® server using the agent's metric history data to illustrate how the metric has been changing over the last few hours. The agent will reference this attachment in the body of the posted message, such that the plot appears in the Socialcast® message.

In various embodiments, where the problem detected by the agent persists, the agent can add a comment to the message. In other words, the agent can emphasize the problem by adding a comment to the message. In one embodiment, where an existing post has already been reported, the agent comments on the past after "liking" the post. In another embodiment, where the agent posts a new message, the agent can add a comment to the message after posting.

In one embodiment, the attachment of a hash tag to a message creates a new topic and corresponding tag cloud in the social network. For instance, in Socialcast®, the size of the tag cloud provides an indication as to the popularity of the message. For example, if a given VM has significantly more processor hash tag messages than disk usage hash tag messages, then it is likely that the VM is experiencing more processor problems than disk usage problems.

The agent will then check to determine if problems observed during prior health checks have been resolved. If such problems have been resolved, the agent queries Socialcast® for the corresponding message. If the agent was the entity to post the message, the agent can comment on the posted message indicating it now sees the problem as resolved. If the agent merely liked an existing post, the agent can unlike the post.

Communicating Messages Over a Social Network to Members of a Virtualization Infrastructure According to at least some embodiments of the present invention, communicating messages from one member of the virtualized infrastructure to one or more other members of the virtualized infrastructure, over a social network, enhances the management and administration of the virtualization infrastructure. Additionally, such messages can include commands that are executed by the recipient member of the social network.

It is noted that virtualization infrastructure is mapped to a social network. Accordingly, at least some of the members of the virtualization infrastructure are also members of the social network of the virtualization infrastructure. For instance, the members of the virtualization infrastructure are mapped into a social network based on the parent/child relationships of the members. Affiliation relationships are established between parent members and child members of the virtualization infrastructure, allowing members to "follow" other members.

More specifically, members of the social network are provided with access to a shared message stream, as described above. For example, members of the social network are able to monitor messages generated by other members of the network posted to the shared message stream. Additionally, some of the messages may contain commands that are to be executed by the recipient member, which will be described in further detail below.

Referring to at least FIGS. 1-3, in various embodiments, a member (e.g., system administrator 105) of social network 300 sends a message to another member (e.g., VM 140a). The message includes a command that is to be executed by the recipient to facilitate in the management of the virtualization infrastructure.

The messages can include various commands which will be described in further detail below. The commands, can include, but are not limited to, turning on a virtual machine, turning off a virtual machine, resetting a virtual machine, obtaining statistics, sending a log file, etc. In various embodiments, the commands can be any command that is able to be accessed and executed with the guest of the VM.

In one embodiment, the message is a private message. That is, the private message is communicated over the social network such that only the intended recipient(s) are able to receive and view the message. The private messaging increases the privacy and security within the social network and the virtualized infrastructure.

In another embodiment, members of the social network (e.g., a virtual machine) include an agent that acts as a daemon. The agent polls for messages intended for the member that hosts the agent. For example, VM 140a includes an agent that periodically or constantly polls the messages that are sent through Socialcast®. As such, if a private message is sent to VM 140a, the agent of VM 140a receives the private message and parses the message for subsequent action, such as, executing a command in the private message. It should be appreciated that the agent may utilize various programming languages (e.g., Python) to poll the message stream.

In one embodiment, the message is validated. For example, the agent, upon receiving the message, validates the message to ensure that the message is from an authorized sender and that the message is not malicious. In such an example, the agent validates that the message is sent from a system administrator, rather than a virtual machine or other non-human member of the social network.

Determining that a message is sent from a member (e.g., system administrator) having requisite permission to send commands over the social network, ensures that the message and associated commands are not malicious. For instance, if a message is sent by a non-human member (e.g., a VM), then there is an increased likelihood that the message may be a malicious message, such as an automatic denial-of-service attack (DoS attack).

Additionally, the message may be read-only or unidirectional to ensure privacy and security of the virtualized infrastructure. For example, by being read-only or unidirectional, the message is only received and read by the intended recipient and is therefore not delivered to others or unintended recipients. Moreover, if the message is malicious, then the malicious message is only read by the recipient and not propagated to other members.

It should be appreciated that a sending member (e.g., system administrator) of the social network is able to send commands to be executed by other receiving members (e.g., a VM) without requiring the sending member to gain access to the receiving member, for example, by logging into the sending member.

In various embodiments, the message may be sent concurrently to various members of the social network. For example, a system administrator may broadcast a message to various members. In such an example, VM 140d posts a message in the shared message stream, via Socialcast®, that it has not been utilized recently. VM 140e and f "like" the message because they also have not been utilized recently. As such, the visibility of the weighted message within the shared message stream is increased. As a result, upon attaining a predetermined weight, the message is propagated to the system administrator. The system administrator views a message that VMs 140d-f are not being utilized. Accordingly, system administrator 105 broadcasts message to VMs 140d-f to turn off.

In one embodiment, the message may be sent in response to a detected operational condition. For example, a message is automatically sent in response to the detection that a VM is not responsive. In such an example, if one or more VMs are not responding quickly, then a message including a command to reset the VM is sent to the sluggish VM. More specifically, in such an embodiment, host 130a sends a periodic heart beat message to VMs 140a-b. In response to host 130a receiving a slow response from VMs 140a-b, a message is sent to the system administrator that VMs 140a-b are responding sluggishly to host 130a. As a result, the system administrator sends a message to VMs 140a-b, wherein the message includes a command to reset. Accordingly, VM 140a-b receive the message which includes a script with the command to reset.

In another example, VMs (or hosts) that are members of a particular network group post a message that there may be a network problem. Accordingly, the system administrator views the message that there is a network problem and sends a message to at least one of the VMs (or hosts) with a command to log all recent connectivity statistics and send the statistics back to the system administrator.

In a further example, if it is determined that a VM has high CPU usage, then a message is automatically sent to load balancer member that increases the CPU allocation for the particular VM.

In one embodiment, the message is sent in response to a change in the virtual infrastructure. For example, in response to a group of VMs being created, a message is sent to a load balancer member to properly allocate resources to the VMs.

Creating a Group of Members Based on Monitoring a Social Network

According to at least some embodiments of the present invention, a social network monitoring agent is able to monitor the social network of the virtualization infrastructure. Various groups are generated based on the information gathered from the monitoring of the social network, for example, by grouping members of the social network based in part on hash tags associated with operational conditions. As a result, the group of members having similar operational conditions facilitate in the management and administration of the virtualization infrastructure, which will be described in further detail below.

In some embodiments, which will be described in further detail below, the hash tags identifying operational conditions of members of the virtualized infrastructure are considered a group. In other words, the hash tags themselves are a conversation within Socialcast®. Additionally, the hash tags may be displayed in a tag cloud that depicts the popularity of the hash tags.

The monitoring agent may be installed on a member of the social network and monitor the social network. The monitoring is enabled by accessing any data associated with the virtualized infrastructure that is accessible through the social network.

The monitoring agent may have global access to social network 300. Alternatively, the monitoring agent may have access and be able to monitor to certain portions of the social network. For example, the monitoring agent may monitor members associated with host 130c and host 130d.

In one embodiment, the monitoring agent may have access to the shared message stream of network 300. For example, the monitoring agent may access a message transmitted from VM 140d to virtualization management server 110, or may access a message from VMs 140a-b to host 130a regarding connectivity with host 130a.

In another embodiment, the monitoring agent accesses a message that is transmitted over Socialcast®. For instance, a message is posted by VM 140d that it has a slow connection with host 130c. VM 140e-f have similar issues and therefore "like" the message posted by VM 140d. The monitoring agent is able to access and monitor the message regarding the connectivity issues of VM 140d-f.

In another embodiment, the agent may access log files provided by members of the social network. For example, the agent may access log files provided by the virtualization management server (e.g., VMware vCenter™). The log files may contain various information related to the members of the social network (e.g., activities, operations, resources usage/allocation, statistics, installed/executed applications, etc.). It should be appreciated that other members have log files, such as, hosts and virtual machines. For example, hosts may contain vSphere®-specific log files and virtual machines may have guest OS log files and/or application specific log files.

The log file may contain information regarding the length of an operation of a member of the social network. For example, virtualization management server 110 provides a log file that details the recent operations of one or more members of social network 300 and the duration to accomplish the operations. In another example, a log file is provided that details the load balancing of resources and of one or more members of social network 300.

The monitoring agent, in one embodiment, parses the received information, such as the log files and/or messages received in the shared message stream. The monitoring agent may extract any pertinent information, or information of interest, that may be useful to facilitate in the management and administration of the virtualized infrastructure. The pertinent information may be but is not limited to, resource usage/allocation, connectivity, load balancing, operational issues, installed/executed applications, etc.

The monitoring agent, in one embodiment, parses the information based on a tag or hash tag that is associated with the pertinent information, such as operational conditions of members of the virtualization infrastructure. A tag or hash tag is a keyword or term assigned to a piece of information. This metadata helps describes the pertinent information and also enables for efficient searching and finding of the pertinent information.

In one example, a plurality of messages that include a comment regarding poor host connectivity with an associated hash tag, resulting in "#poor_host_connectivity." Accordingly, the monitoring agent parses any of the messages that contain the hash tagged comment of "#poor_host_connectivity."

In various embodiments, the monitoring agent is able to automatically generate a group of members based on the parsing of the hash tagged comments. That is, a group of members is created based in part on the parsed information from the social network. The group of members facilitates in the management and administration of the virtual infrastructure.

For example, a group is created that includes all the VMs that made a comment or liked a comment that included "#poor_host_connectivity."

In another example, various members of the social network post (or like) a message over the shared message stream, via Socialcast®, indicating that they have a low CPU allocation. The message includes a hash tagged comment of "#low_CPU_allocation." Accordingly, the monitoring agent generates a group of all the members that posted (or liked) a message that included the hash tagged comment of "#low_CPU_allocation."

In one embodiment, a group is generated in response to a pre-determined number of hash tagged comments that are monitored. For example, a group is not generated until ten different messages communicated over the shared message stream include a similar comment about, for example, low memory allocation. In such an example, the monitoring agent monitors the messages communicated over the shared message stream via Socialcast®. Once the monitoring agent monitors ten separate messages (or likes) from members of the social network having, for example, tagged comments regarding low memory allocation, then the monitoring agent automatically generates a group of members that have made or liked comments associated with low member allocation.

As described above, the monitoring agent may receive and parse the information of a log file. The log file may include the duration of recent operations of one or more members of the social network. For example, the durations of operations are broken down into categories of 5 seconds, 15 seconds, and over 30 seconds. As such, in such an example, the operations are parsed and associated with a hash tag resulting in "#5_seconds," "#15_seconds," and "#30+_seconds." Accordingly, the monitoring agent can generate a group of all the members that have current operational durations of more than 30 seconds.

In one embodiment, the monitoring agent sends a message to the system administrator indicating that a group has been generated. For example, once a group is formed by the monitoring agent, such as a group associated with low memory allocation, the monitoring agent then sends a message (e.g., a private message) to the system administrator indicating that a group has been generated associated with tagged messages regarding low memory allocation. Accordingly, the system administrator may utilize the automatically generated grouping to search the group to determine the reasons for low memory allocation and help solve the problem for low memory allocation of social network members.

It should also be appreciated that the system administrator can look at the Socialcast® UI to determine that a new group is created. Also, in one embodiment, Socialcast® indicates that a group has a new message for example, by placing a visual indicator (e.g., a bubble) next to the group.

The group of members provides analytics for administration and management of the virtualized infrastructure. That is, the group of members provides information, such as hash tagged operational conditions, associated with the group of members. For example, ten members having poor host connectivity are grouped together. Accordingly, a system administrator, for example, can access the group and determine that there is a problem in the virtualization infrastructure with host connectivity. Additionally, the user is able to see which ten members have the poor host connectivity. Other various information may also be included in the group, such as, but not limited to, the member who posted the initial message regarding host connectivity to the shared message stream and which members liked the message, etc. Therefore, the information provided in the group, based in part on hash tagged operational conditions of members of the social network, provides analytics such that the system administrator can troubleshoot and solve problems of the virtualized infrastructure.

In one embodiment, groups of members may be prioritized with respect to one another. For instance, a first group of members is generated based on posted messages regarding low CPU allocation, and a second group of members is generated based on posted message regarding low memory allocation. The first group was generated from twenty posted message having hash tags identifying the low CPU allocation, while the second group was generated from ten posted messages having hash tags identifying the low memory allocation. Accordingly, the first group is prioritized over the second group. In one such example, a private message may be sent to the system administrator indicating the creation of the first group before a private message is sent indicating the creation of the second group because of the higher priority of the first group.

It should be appreciated that groups may be prioritized in variety of ways. For example, a first group of members comprising twenty VMs associated with twenty different hosts is prioritized over a second group of members comprising ten VMs all on the same host.

In another embodiment, visibility or weight of groups of members may be increased with respect to one another. For instance, a first group of members is generated based on posted messages regarding low CPU allocation, and a second group of members is generated based on posted message regarding low memory allocation. The first group was generated from ten posted message having hash tags identifying the low CPU allocation with a combined twenty likes, while the second group was generated from ten posted messages having hash tags identifying the low memory allocation with a combined ten likes. Accordingly, the visibility or weight of the first group of members is increased. In one such example, a private message may be sent to the system administrator indicating the creation of the first group before a private message is sent indicating the creation of the second group because of the higher priority of the first group.

Selecting Tags in Messages to Facilitate Administration of a Virtualization Infrastructure According to at least some embodiments of the present invention, messages posted by members of the virtualization infrastructure are displayed to a user of the virtualization infrastructure, such as, a system administrator. The messages include tags that identify, among other things, the operational conditions of the members of the virtualization infrastructure. Accordingly, a user is able to search for and find various operational conditions, and their related members, to facilitate in the management and administration of the virtualization infrastructure.

As described above, members of virtualization infrastructure 100 are mapped to social network 300. As such, members of social network 300 are enabled to post messages on a shared message stream, for example, through Socialcast®. Moreover, the members may like or comment on messages that are posted on the shared message stream.

In various embodiments, the posted messages may include information regarding the operational conditions of the members. In particular, the messages may include tags (e.g., hash tags) that identify the operational conditions of the members.

In general, tag is a word or a phrase prefixed with the symbol, such as #. The tag is a form of metadata tag. The tags provide a means of grouping such messages, since one can search for the tag and get the set of messages that contain it.

As a result, the tagged messages allow for quick and efficient searching of operational conditions (e.g., problems, issues, etc.) which enhances the management and administration of the virtualized infrastructure. For example, a system administrator may quickly isolate problems of the virtualization infrastructure and make the appropriate fix based on the ease of searching with the tagged messages.

FIGS. 12A, 12B, 12C, and 12D depicts displays 1200A, 1200B, 1200C, and 1200D, respectively, of embodiments of messages posted by members of the virtualization infrastructure and information associated with such posted messages.

Figure 12A:
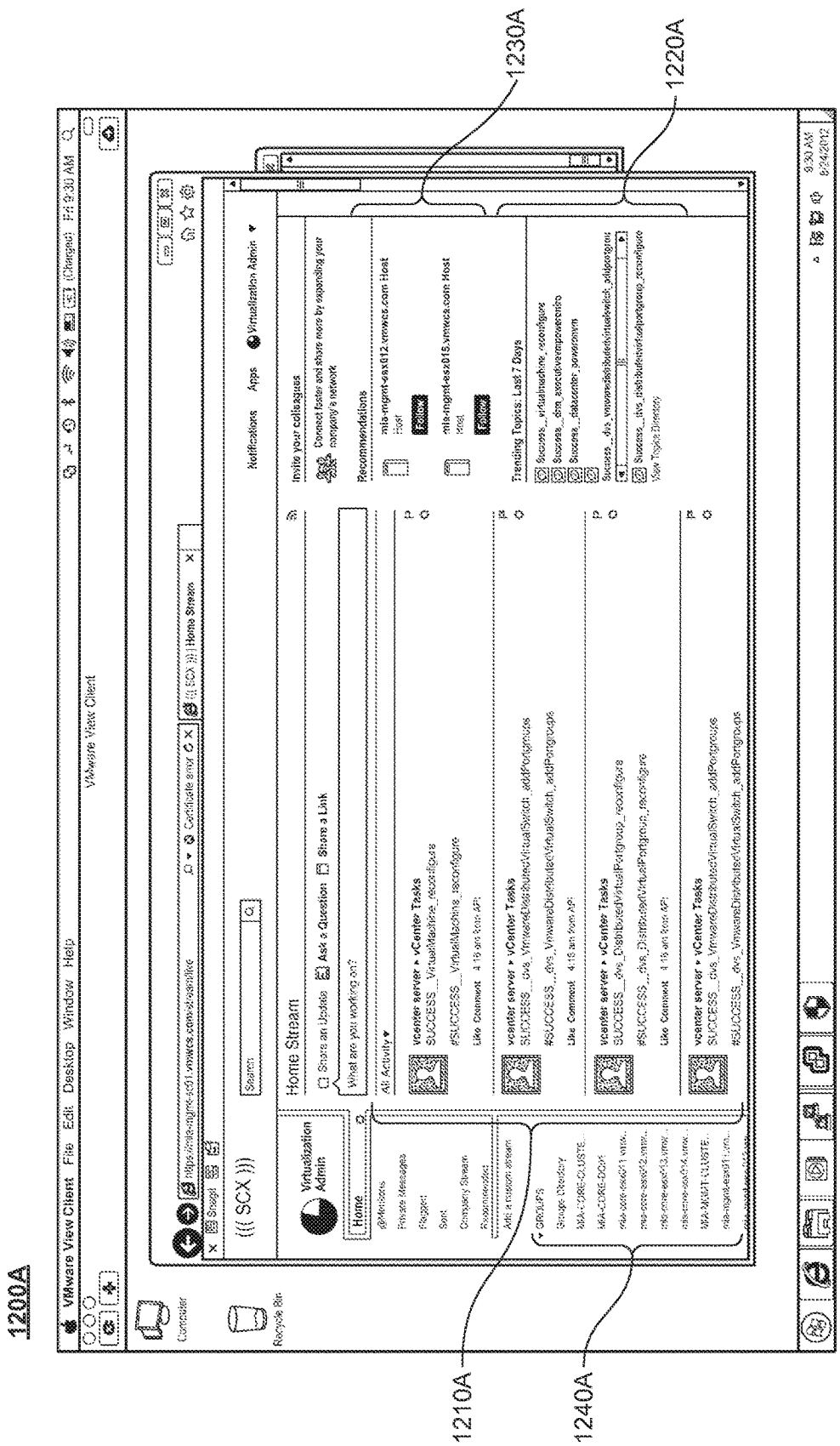
FIGS. 12A, 12B, 12C, and 12D are example screenshots of a display of tagged messages posted to a shared message stream.

Referring to FIG. 12A, display 1200A includes message portion 1210A that displays messages posted in the shared message stream of social network 300. In one embodiment, message portion 1210A can include all posted messages. In another embodiment, message portion 1210A can include a subset of the messages, such as messages posted within the past four days.

In one embodiment, a message in the message portion 1210A includes a title (e.g., SUCCESS_VirtualMachine_reconfigure), a message body (#SUCCESS_VirtualMachine_reconfigure), a name of the entity that is posting the message (e.g., vCenter server), and the name of the group/stream that the entity is posting to (e.g., vCenter Tasks).

Additionally, the message may be time stamped and may include options to like the message and add a comment to the posted message.

Display 1200A, in one embodiment, includes tag cloud 1220A. In such an embodiment, tag cloud 1220 includes the top trending topics, such as the top trending topics within the past 7 days.

In various embodiments, a tag cloud (e.g., a word cloud, weighted list, etc.) is a visual representation for text data. Typically, a tag cloud is used to depict keyword metadata (tags) or to visualize free form text. Tags are usually single words and/or phrases, and the importance of each tag may be shown with order, font size, color, etc. The tag cloud is useful for quickly perceiving the most prominent words/terms.

Display 1200A may also include recommendations 1230A. Recommendations 1230A may recommend the following of various entities (e.g., members, hosts, groups, messages, and the like) that may be of interest in further facilitating in the management and administration of virtualization infrastructure 100.

Display 1200A, in one embodiment, includes groups portion 1240A. Groups portion 1240A is a listing of various groups in virtualization infrastructure 100 and/or social network 300. In one embodiment, groups 1240A may include a cluster (e.g., cluster 135). In one embodiment, cluster 135 includes hosts 130a-b and VMs 140a-c. Accordingly, if one of the listed groups in groups 1240A is selected, then messages of the selected group are displayed in messages portion 1210A. Also, in some embodiments, groups listed in groups 1240A correspond to VMware VIM API.

Figure 12B:
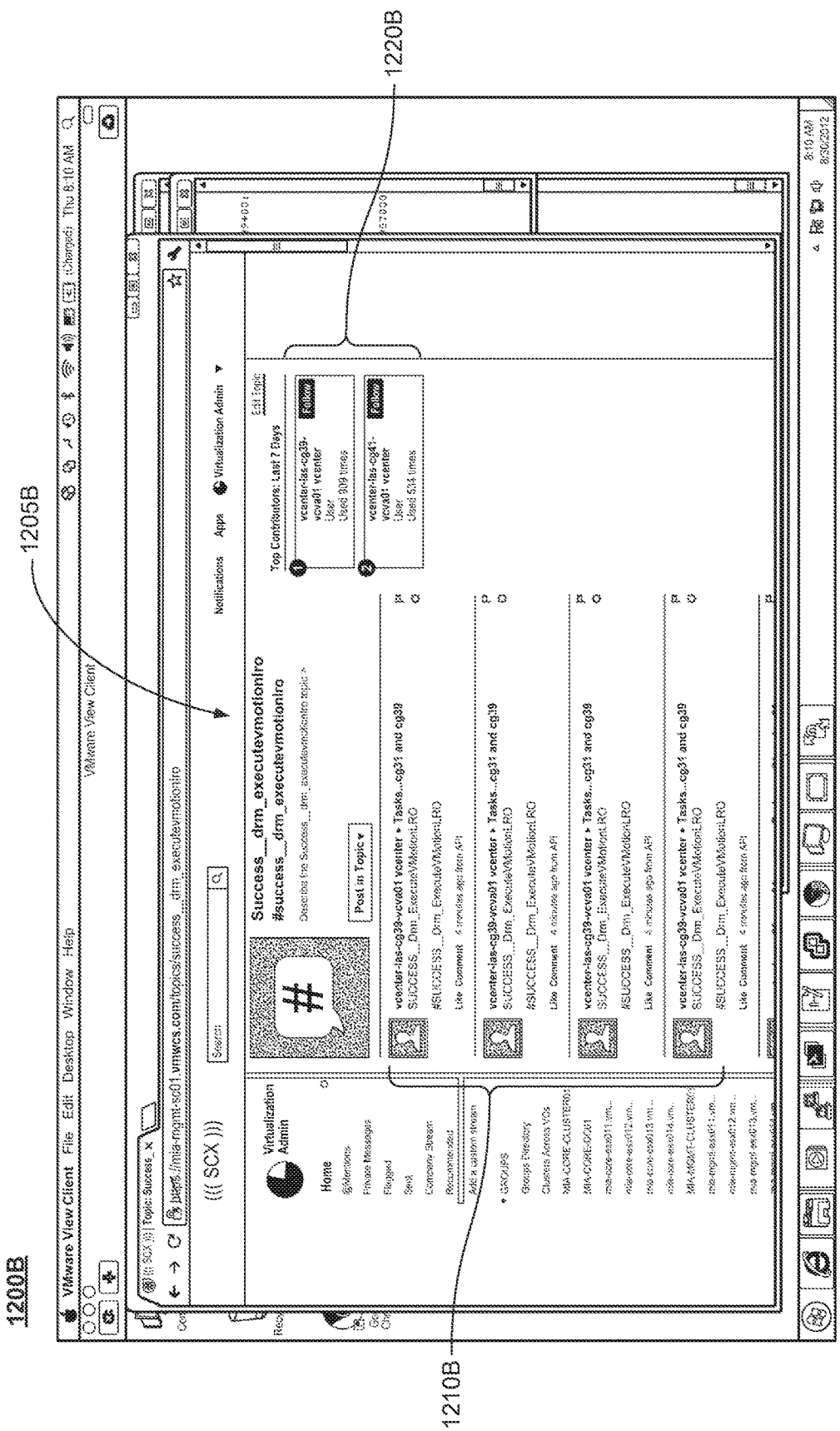

Referring to FIG. 12B, display 1200B depicts an embodiment of selected hash tag 1205B (e.g., #success_drm_executevmotionlro) and all the messages that contain the selected hash tag. For instance, a tagged message is selected in message portion 1210A. In response to the selection of the hash tag (e.g., #success_drm_executevmotionlro) in message portion 1210A, the messages contain the selected hash tag are displayed in message portion 1210B.

In various embodiments, message portion 1210B includes a listing of a member that includes the name of the member, the message that the member posted, and a tag associated with the posted message. Additionally, the listing of the member may also include the ability to like and/or comment on the comment made by the member.

Display 1200B, in one embodiment, includes tag cloud 1220B. Tag cloud 1220B can be any tag cloud that emphasizes the importance of each tag by order, font size, color, etc. In one embodiment, tag cloud 1220B depicts the top contributors to selected hash tag 1205B, such as the top contributors in the last 7 days.

Figure 12C:
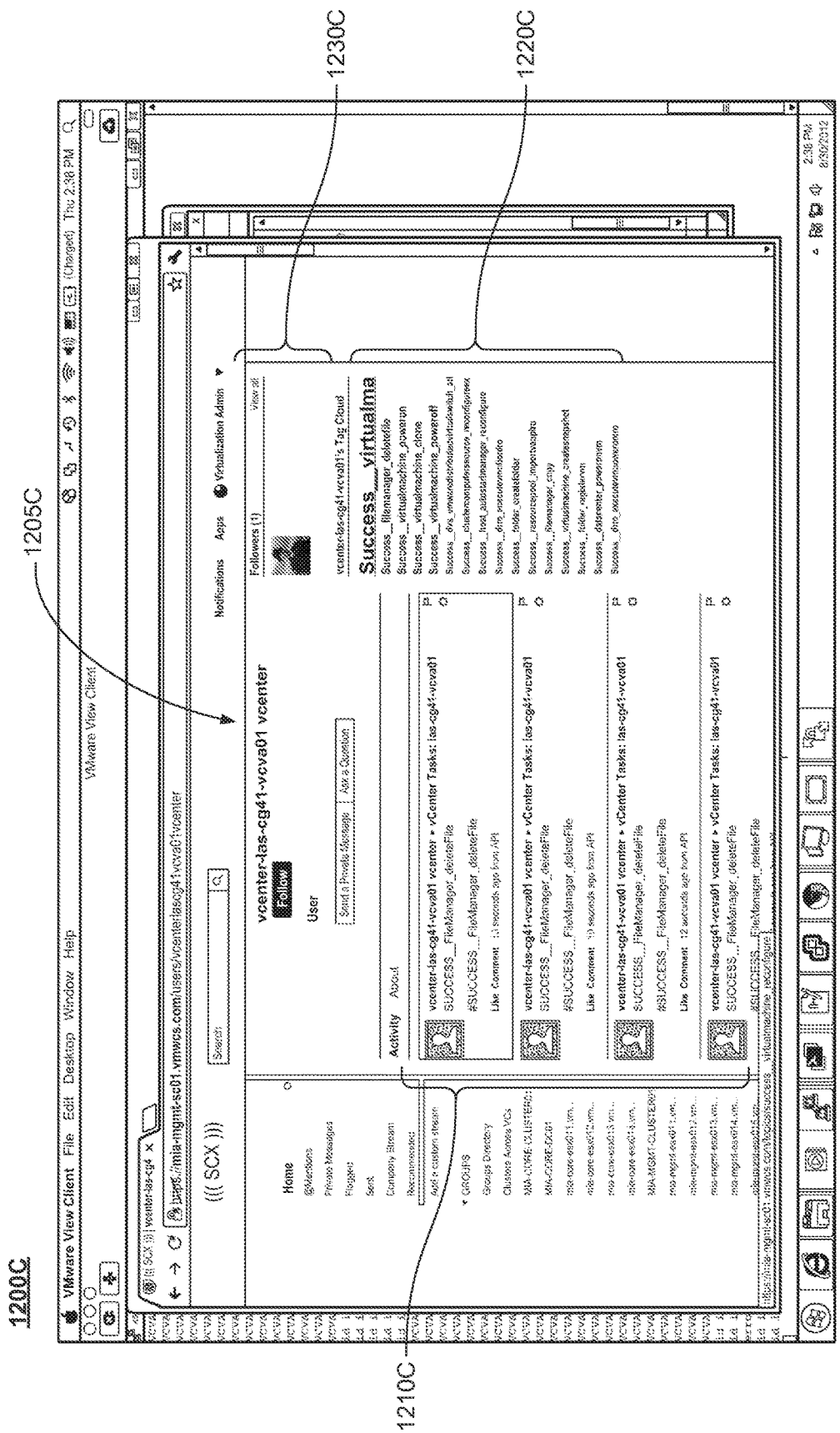

Referring to FIG. 12C, display 1200C depicts an embodiment of a selected member 1205C and message portion 1210C that lists the messages posted by selected member 1205C. For instance, a member is selected in message portion 1210B. In response to the selection of a member (e.g., vcenter-las-cg41-vcva01 vcenter) in message portion 1210B, the various messages that are posted by the selected member are displayed in message portion 1210C.

In one embodiment, the messages depicted in message portion 1210C include, among other things, a title (e.g., SUCCESS_FileManager_deleteFile), and a body of the message (e.g., #SUCCESS_FileManager_deleteFile). The title may or may not contain a hash tag, while the body may contain various hash tags. It should be appreciated that the title may be short description of the message.

Display 1200C, in one embodiment, includes tag cloud 1220C. Tag cloud 1220C can be any tag cloud that emphasizes the importance of each tag by order, font size, color, etc.

In one embodiment, tag cloud 1220C emphasized the most active topics posted by selected member 1205C. For instance, the most active topics s are listed at the top of the list and in a larger font as compared to the least active topics that have a smaller font and listed towards the bottom of the tag cloud. It should be appreciated that a hash tag is a topic or a conversation.

Display 1200C may also include followers 1230C. That is, the members of the social network that follow the selected member 1205C are displayed. Similarly, in one embodiment, the following members are displayed. That is, the members of the social network that the selected member 1205C follows are displayed in display 1200C.

Accordingly, the hierarchy of information enables for quick and efficient searching of issues or problem events in the virtualization infrastructure. Additionally, a system administrator may also quickly and efficiently provide a proper solution to the issues/problems by quickly finding the issues/problems.

Additionally, the hierarchy of information enables for quick and efficient search of various operational conditions, such as work load. For example, a hash tag may be associated with each task performed by a member. As such, the workload of the member may be inspected via the hash tag and the number of occurrences of each hash tag.

Figure 12D:
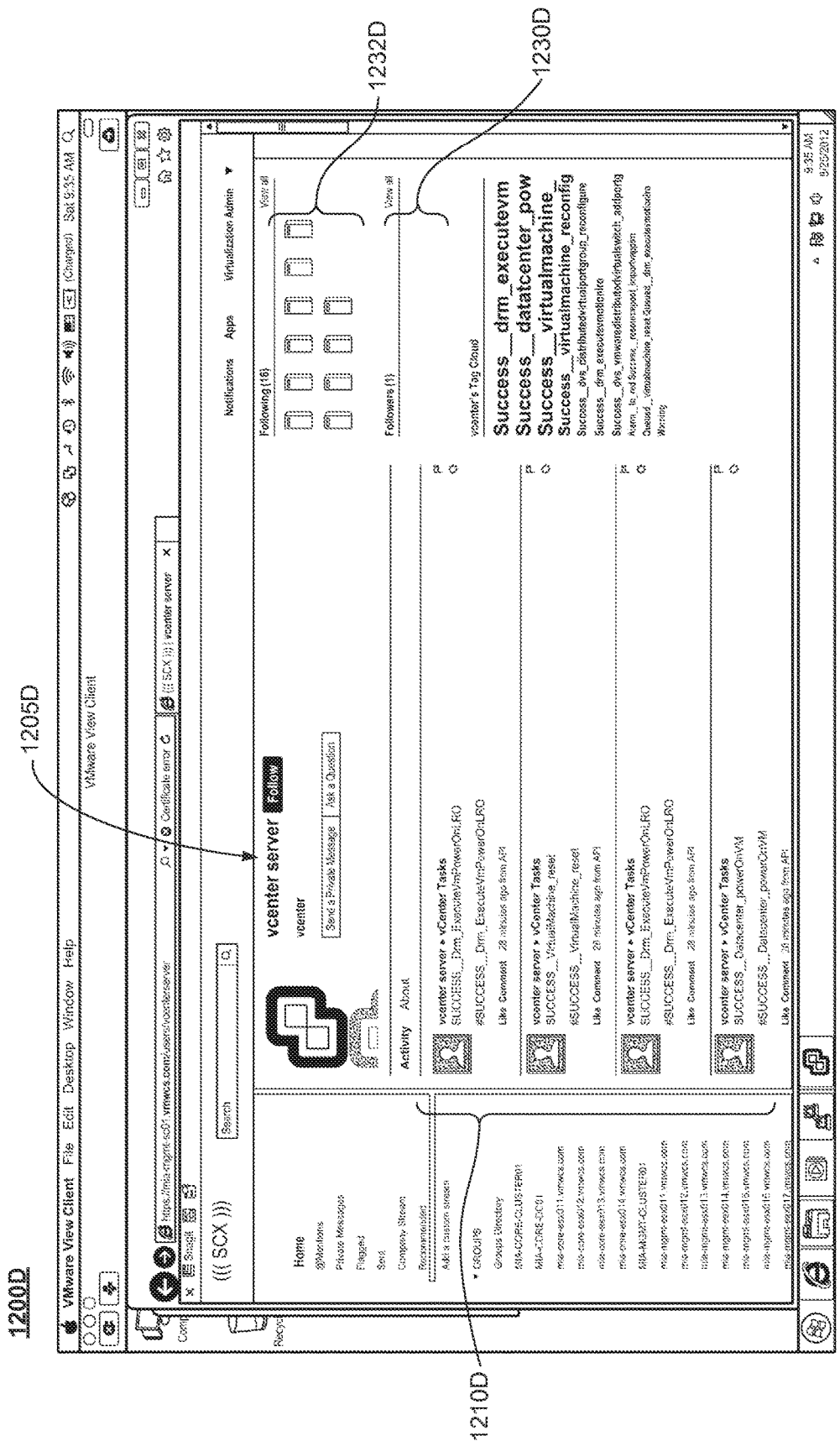

Referring to FIG. 12D, display 1200D depicts an embodiment of a selected member 1205D and message portion 1210D that lists the messages posted by selected member 1205D. For instance, a member is selected in message portion 1210B. In response to the selection of a member (e.g., vcenter server) in message portion 1210B, the various messages that are posted by the selected member are displayed in message portion 1210D.

Display 1200D also includes followers portion 1230D that lists the members of social network 300 that follow the selected member (e.g., vcenter server). Display 1200D also includes following portion 1232D that lists the members of the social network 300 that the selected member is following.

Example Methods of Operation

The following discussion sets forth in detail the operation of some example methods of operation of embodiments. With reference to FIGS. 4A-11 and 13-15, and, flow diagram 400, 500, 600, 700, 800, 900, 1000, 1100, 1300, 1400, 1500 and 1600 illustrate example procedures used by various embodiments. Flow diagrams 400, 500, 600, 700, 800, 900, 1000, 1100, 1300, 1400, 1500 and 1600 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within virtualization infrastructure 100. The computer-readable and computer-executable instructions, which reside on tangible computer readable storage media, are used to control or operate in conjunction with, for example, one or some combination of processors of virtualization infrastructure 100. It is appreciated that the processor(s) may be physical or virtual or some combination (it should also be appreciated that a virtual processor is implemented on physical hardware). Although specific procedures are disclosed in flow diagrams 400, 500, 600, 700, 800, 900, 1000, 1100, 1300, 1400, 1500 and 1600, such procedures are examples. That is, embodiments are well suited to performing various other procedures or variations of the procedures recited in flow diagram 400, 500, 600, 700, 800, 900, 1000, 1100, 1300, 1400, 1500 and 1600, alone or in combination. Likewise, in some embodiments, the procedures in flow diagrams 400, 500, 600, 700, 800, 900, 1000, 1100, 1300, 1400, 1500 and 1600, alone or in combination, may be performed in an order different than presented and/or not all of the procedures described in one or more of these flow diagrams may be performed. It is further appreciated that procedures described in flow diagram 400, 500, 600, 700, 800, 900, 1000, 1100, 1300, 1400, 1500 and 1600, alone or in combination, may be implemented in hardware, or a combination of hardware with firmware and/or software.

FIGS. 4A-D are flow diagram 400 of a method for creating a social network of members of a virtualization infrastructure, according to various embodiments of the present invention. Although specific procedures are disclosed in flow diagram 400, embodiments are well suited to performing various other procedures or variations of the procedures recited in flow diagram 400. It is appreciated that the procedures in flow diagram 400 may be performed in an order different than presented, that not all of the procedures in flow diagram 400 may be performed, and that additional procedures to those illustrated and described may be performed. All of, or a portion of, the procedures described by flow diagram 400 can be implemented by a processor or computer system executing instructions which reside, for example, on computer-usable/readable media.

At procedure 410 of flow diagram 400, at least a portion of the members of the virtualization infrastructure are identified at a virtualization infrastructure manager. For example, with reference to FIG. 1, in one embodiment, virtualization management server 110 starts at any node (e.g., member) of virtualization infrastructure 100 and locates all children of that node. In one embodiment, the active members of the virtualization infrastructure are identified. For purposes of the instant specification, this operation is also referred to as mapping the virtualization infrastructure.

In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts.

In one embodiment, at procedure 412, the child members of the respective member are identified for a respective member of the virtualization infrastructure. In one embodiment, as shown at procedure 414, it is identified whether the child members are active participants of the social network or passive participants of the social network. As described above, wherein the active participants are able to generate a message to a shared message stream of the social network.

In one embodiment, the passive participants of the social network represent a group of the active participants. For example, datacenter 120a is a passive participant in the social network. However, it is group 320a for its connected host 130a-b and VMs 140a-c. In another embodiment, parent members that are active participants represent a group of the child members of the respective parent members that are active participants. For example, host 130a is a group for VMs 140a and 140b.

At procedure 420, parent/child relationships of the identified members of the virtualization infrastructure are identified. In one embodiment, the parent/child relationships are determined as virtualization management server 110 locates the children of the nodes.

At procedure 430, a social network of the identified members of the virtualization infrastructure based on the parent/child relationships is generated. In one embodiment, the social network is generated having the hierarchy of the virtualization infrastructure. Affiliation relationships between the parent and child members of the virtualization infrastructure are established (e.g., follower/followee relationships or friend relationships).

At procedure 440, affiliation relationships between parent members and child members of the virtualization infrastructure are established. The affiliation relationships allow for child members to access shared message streams corresponding to the parent members. A child member can establish an association of a message with an indication that the child member identifies with content of the message (e.g., "likes" the message). In one embodiment, the child member is configured to establish the association. In one embodiment, the affiliation relationships are established between respective parent members and child members that are able to generate a message to a shared message stream of the social network.

Figure 4B:
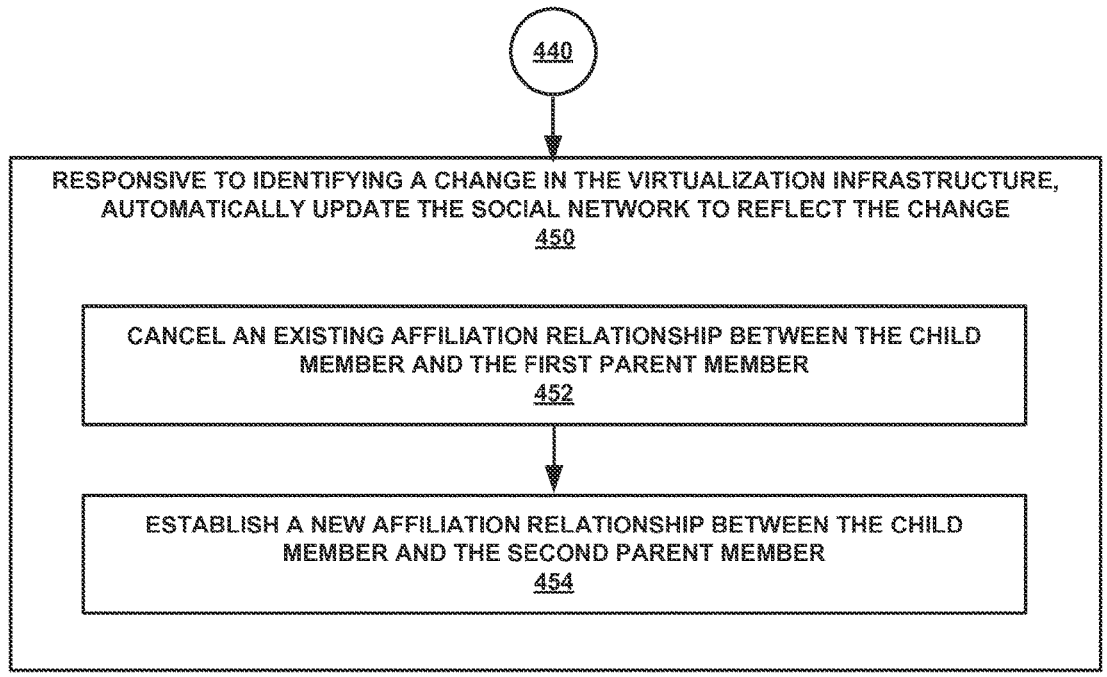

With reference to FIG. 4B, in one embodiment, flow diagram 400 proceeds to procedure 450. At procedure 450, responsive to identifying a change in the virtualization infrastructure, the social network is automatically updated to reflect the change. In various embodiments, the change in the virtualization infrastructure is the removal of a member, the addition of a member, or the movement of a child member from a first parent member to a second parent member. Where the change is the movement of a child member from a first parent member to a second parent member, as shown at procedure 452, an existing affiliation relationship between the child member and the first parent member is cancelled. At procedure 454, a new affiliation relationship between the child member and the second parent member is established.

Figure 4C:
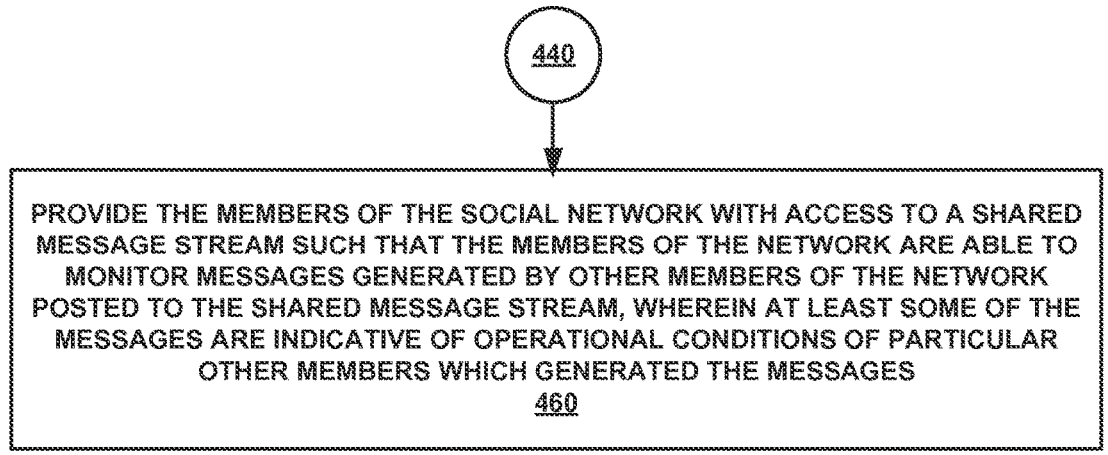

With reference to FIG. 4C, in one embodiment, flow diagram 400 proceeds to procedure 460. At procedure 460, the members of the social network are provided with access to a shared message stream such that the members of the network are able to monitor messages generated by other members of the network posted to the shared message stream. In various embodiments, at least some of the messages are indicative of operational conditions of particular other members which generated the messages.

Figure 4D:
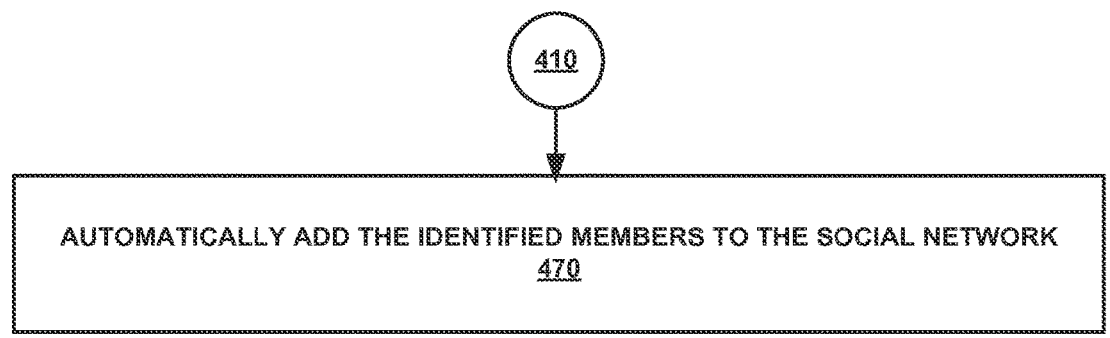

With reference to FIG. 4D, in one embodiment, flow diagram 400 proceeds to procedure 470. At procedure 470, the identified members are automatically added to the social network. For example, an identified member is created in the social network using the MAC address of the associated members as the username and email. In another embodiment, the UUID for a VM is used as the member's username and email. The social network can provide the member with its permanent access information, e.g., Socialcast® ID, over the social network using the initial login information.

FIGS. 5A-F are a flow diagram of a method for facilitating administration of a network of members, according to various embodiments of the present invention. Although specific procedures are disclosed in flow diagram 500, embodiments are well suited to performing various other procedures or variations of the procedures recited in flow diagram 500. It is appreciated that the procedures in flow diagram 500 may be performed in an order different than presented, that not all of the procedures in flow diagram 500 may be performed, and that additional procedures to those illustrated and described may be performed. All of, or a portion of, the procedures described by flow diagram 500 can be implemented by a processor or computer system executing instructions which reside, for example, on computer-usable/readable media.

At procedure 510 of flow diagram 500, the members of the network are mapped to a social network. In one embodiment, the network includes a virtualization infrastructure. In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts.

In one embodiment, this is performed in accordance with flow diagram 400 of FIGS. 4A-4D. In one embodiment, procedure 510 is performed as illustrated in FIG. 5B. At procedure 512, respective indications that particular members of the network are following other particular members of the network are received. At procedure 514, responsive to receiving the respective indications, it is determined that the other particular members of the network are following the particular members of the network. In other words, upon receiving an indication that member A is following member B, it is determined that member B is also following member A. At procedure 516, a mapping of the members is maintained, where the mapping based at least in part on the respective indications and the determining that the other particular members of the network are following the particular members of the network.

At procedure 520, members of a network are provided with access to a shared message stream such that the members of the network are able to monitor messages generated by other members of the network posted to the shared message stream. At least some of the messages are indicative of operational conditions of particular other members which generated the messages.

Figure 5C:
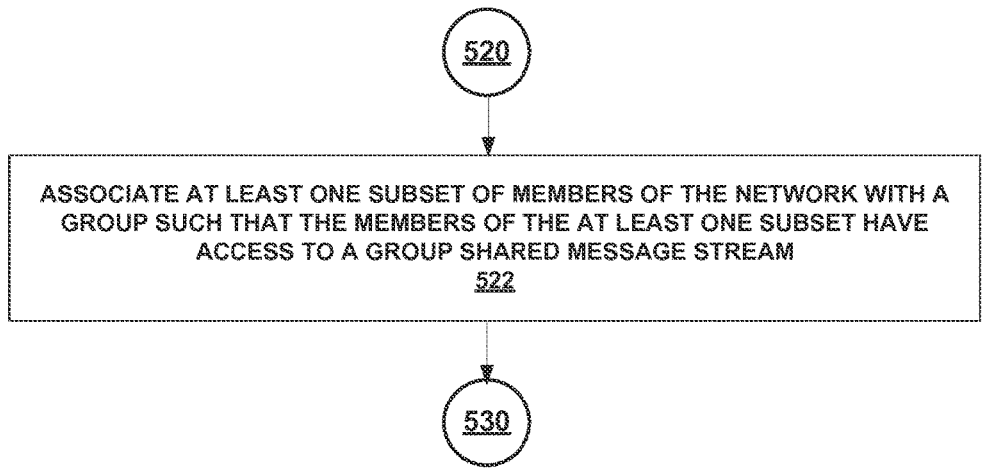

In one embodiment, as shown in FIG. 5C, flow diagram 500 proceeds to procedure 532. At procedure 532, at least one subset of members of the network is associated with a group such that the members of the at least one subset have access to a group shared message stream.

Figure 5D:
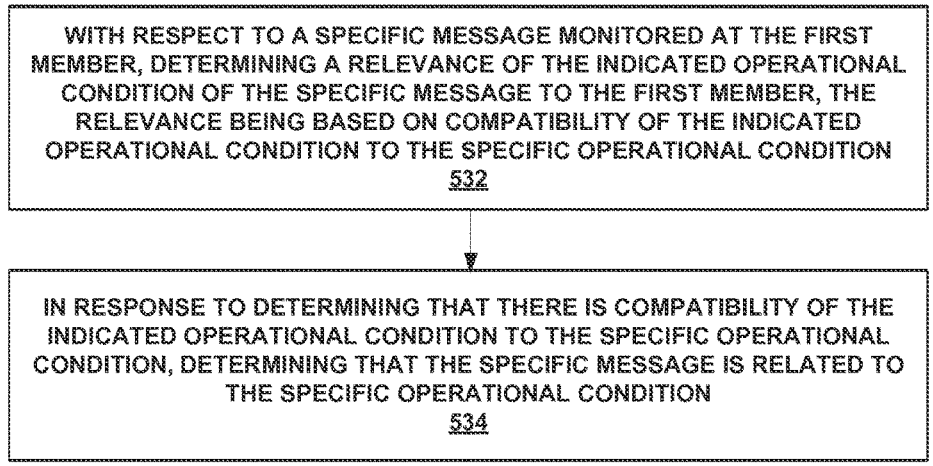

At procedure 530, responsive to a first member of the network identifying a specific operational condition of the first member, the shared message stream is monitored for a message related to the specific operational condition. In one embodiment, procedure 530 is performed as illustrated in FIG. 5D. At procedure 532, with respect to a specific message monitored at the first member, a relevance of the indicated operational condition of the specific message to the first member is determined. The relevance is based on compatibility of the indicated operational condition to the specific operational condition. As shown at procedure 534, in response to determining that there is compatibility of the indicated operational condition to the specific operational condition, it is determined that the specific message is related to the specific operational condition. In one embodiment, the messages include a group identifier and a hash tag providing information related to the operational condition. It should be appreciated that responsive to a request for the information provided by a particular hash tag, for example, by a system administrator, access to messages including the hash tag across the network can be provided.

For example, with reference to FIG. 3, VM 140a identifies a specific operational condition, e.g., it lost a connection to a particular server. VM 140a will then monitor a shared message stream for a message indicating the same condition. It should be appreciated that the shared data stream can be for host 130a (VMs 140a and 140b), for group 320a (VMs 140a-c), or for any other combination of members. A message is scanned to determine whether it is related to the specific operational condition.

Figure 5E:
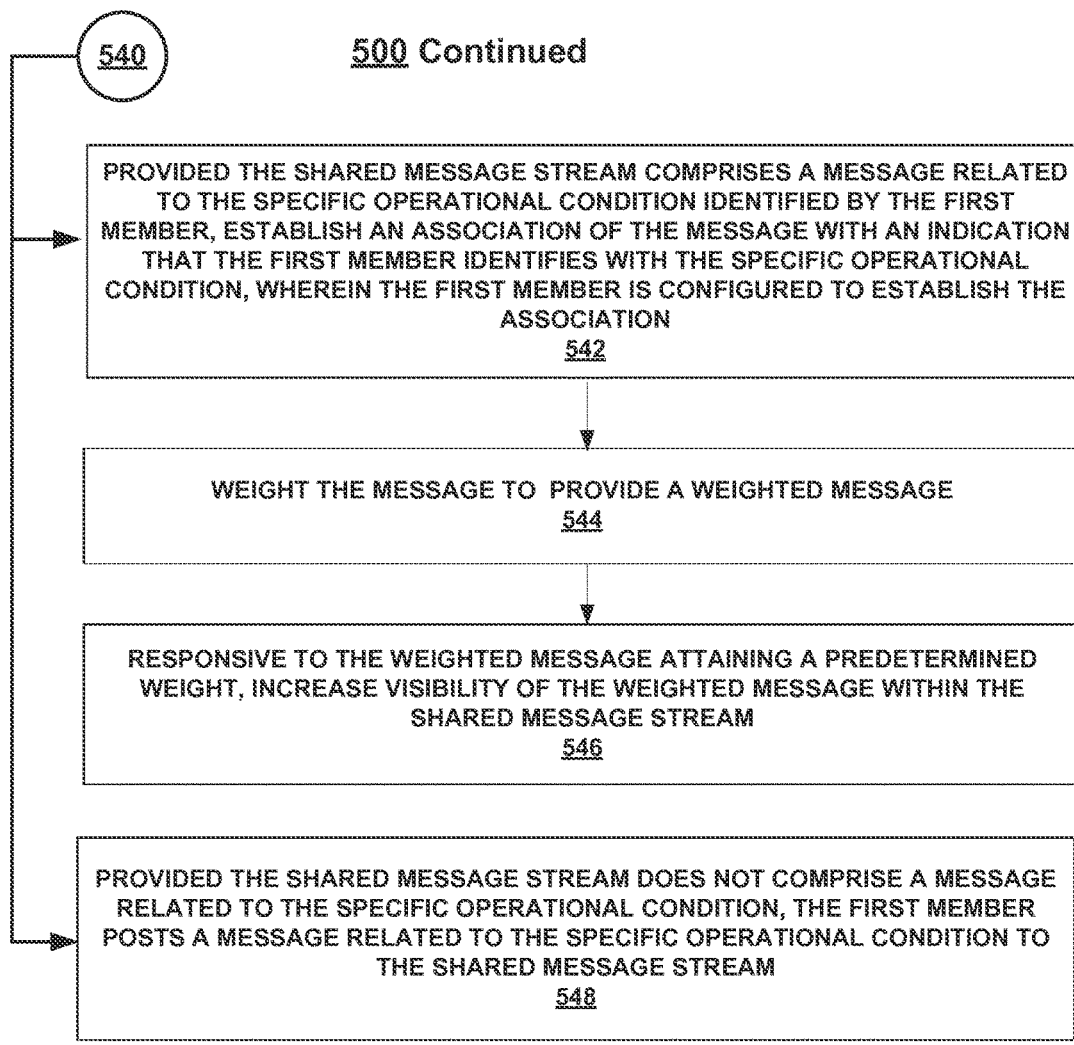

Returning to FIG. 5A, at procedure 540, an update to the at least one shared message stream is received with an indication that the first member has identified the specific operational condition. In one embodiment, procedure 540 is performed as illustrated in FIG. 5E. At procedure 542, provided the shared message stream includes a message related to the specific operational condition identified by the first member, an association of the message with an indication that the first member identifies with the specific operational condition is established, e.g., the first member "likes" the message. In one embodiment, the first member is configured to establish the association. In one embodiment, as shown at procedure 544, the message is weighted to provide a weighted message. For example, each association, or "like," adds weight to the message, increasing its relative importance. At procedure 546, responsive to the weighted message attaining a predetermined weight, the visibility of the weighted message within the shared message stream is increased. For example, upon attaining a predetermined weight, the message is propagated to the system administrator.

At procedure 548, provided the shared message stream does not include a message related to the specific operational condition, the first member posts a message related to the specific operational condition to the shared message stream. This message is available in the shared message stream for monitoring by other members, and can receive associations.

Figure 5F:
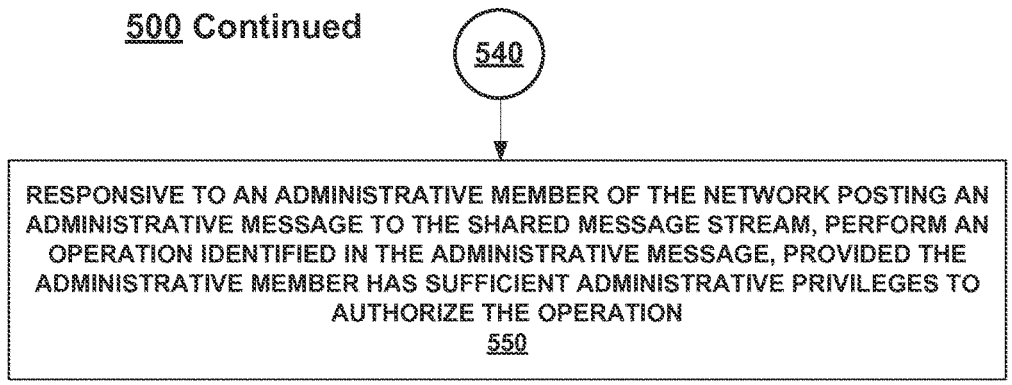

In one embodiment, as shown in FIG. 5F, flow diagram 500 proceeds to procedure 550. At procedure 550, responsive to an administrative member of the network posting an administrative message to the shared message stream, an operation identified in the administrative message is performed, provided the administrative member has sufficient administrative privileges to authorize the operation.

Figure 7:
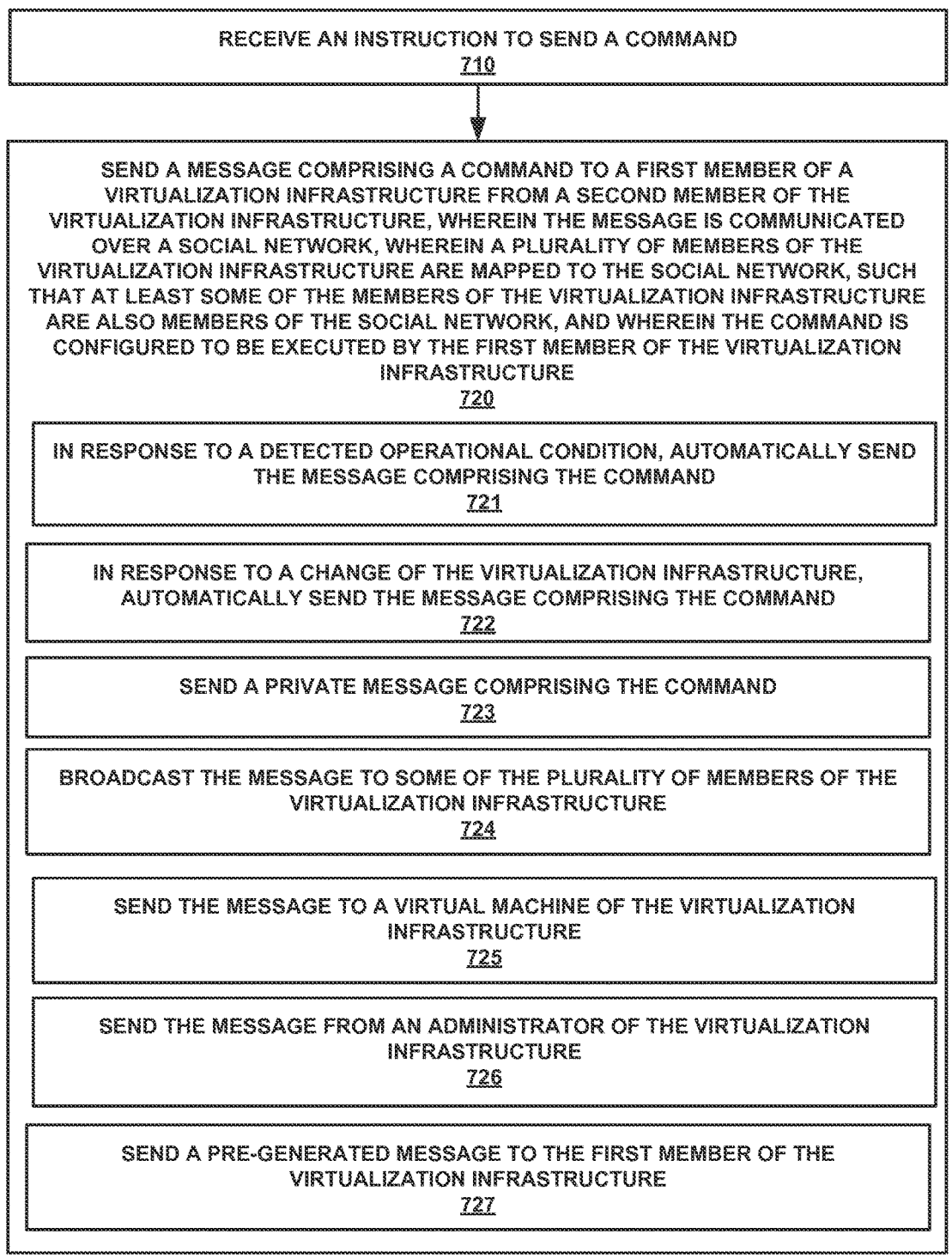
Figure 8:
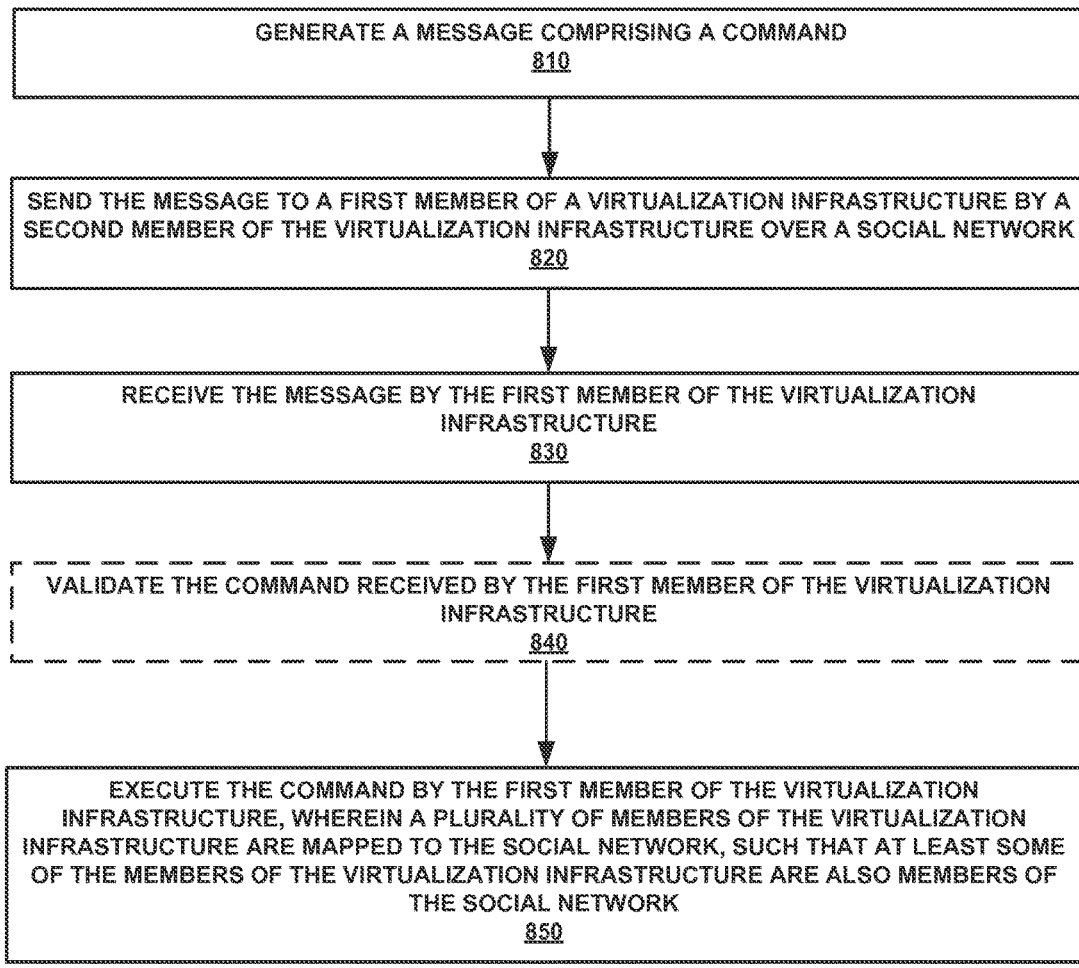

FIGS. 6, 7 and 8 are flow diagrams 600, 700 and 800, respectively, of methods for communicating messages over a social network to members of a virtualization infrastructure, according to various embodiments of the present invention. Although specific procedures are disclosed in flow diagrams, embodiments are well suited to performing various other procedures or variations of the procedures recited in flow diagrams. It is appreciated that the procedures in flow diagrams may be performed in an order different than presented, that not all of the procedures in flow diagrams may be performed, and that additional procedures to those illustrated and described may be performed. All of, or a portion of, the procedures described by flow diagrams can be implemented by a processor or computer system executing instructions which reside, for example, on computer-usable/readable media.

At procedure 610 of flow diagram 600, a message comprising a command is received at a first member of a virtualization infrastructure, wherein the message is communicated over a social network from a second member of the virtualization infrastructure. For example, system administrator 105 sends a message to VM 140c over network 300, wherein the message includes a command or script to turn on the VM.

As described in further detail below, it should be appreciated that a message may be sent from one member to one or more other members. For example, a message may be broadcasted from one member (e.g., system administrator) to various members (e.g., various VMs). In another example, a private message may be sent from one member (e.g., system administrator) to another member(s) such that the only the intended recipients receive the message.

It is noted that plurality of members of the virtualization infrastructure are mapped to the social network, such that at least some of the members of the virtualization infrastructure are also members of the social network At procedure 611, in response to a detected operational condition, a message comprising a command is received at the first member of the virtualization infrastructure. For example, if one or more VMs (e.g., VMs 140d-g) are processing at a slow rate due to a high database latency, then a message is sent to the one or more VMs requesting the most recent queries associated the database.

At procedure 612, in response to a change in the virtualization infrastructure, a message comprising a command is received at the first member of the virtualization infrastructure. For example, if a VM is removed from a group of VMs, then a load balancer member receives a message to adjust the resource allocation for the remaining VMs in the group.

At procedure 613, the message comprising a command is received at some of the plurality of members of the virtualized infrastructure. For example, system administrator 105 sends a message to VM 140*a-c* with a command to provide a log file of recent activity.

At procedure 614, a private message comprising a command is received at the first member of the virtualized infrastructure. For example, VM 140*b* receives a private message from system administrator 105. The private message is communicated through social network 300 such that the recipient VM 140*b* is the only member that receives the message.

At procedure 615, a message comprising a command is received at a virtual machine of the virtualized infrastructure. For example, system administrator 105 sends a message having a command of turning on the VM is sent to VM 140*c*.

At procedure 620, the command is executed by the first member of the virtualization infrastructure. For example, VM 140*a* that receives a command to send a log file of recent activities, executes the command and sends a log file of recent activities to the system administrator.

At procedure 630, optionally, the first member periodically polls for any messages. For example, the agent of VM 140*a* periodically polls for private message sent through social network 300.

At procedure 640, optionally, the command received by the first member of the virtualization infrastructure is validated that it is issued by an administrator of the virtualization infrastructure. For example, upon receiving the message, an agent of VM 140*a* validates that the message is from a human user, such as, a system administrator.

At procedure 650, the command is executed by the first member of the virtualization infrastructure. For instance, VM 140*a* receives the private message that includes a script with a command to send a log file. Accordingly, the script is parsed and the command to send a log file is executed.

At procedure 710 of flow diagram 700, an instruction to send a command is received. For example, VM 140*d-f* each "like" a message that they are experiencing a poor connection with host 130*c*. The message attains a predetermined weight and is propagated to the system administrator such that the system administrator may act on such a message. Additionally, the virtualization management server 110 is provided instructions to automatically send VM 140*d-f* a command to send a log file to the system administrator to provide the system administrator with additional information regarding the poor connection with the host.

At procedure 720, a message comprising a command is sent to a first member of a virtualization infrastructure from a second member of the virtualization infrastructure, wherein the message is communicated over a social network. For example, a member (e.g., system administrator 105) receives the message that VM 140*d-f* have a poor connection with host 130*c*. Accordingly, the member sends a message to VM 140*d-g* containing a command to reset.

At procedure 721, optionally, in response to a detected operational condition, the message comprising the command is automatically sent. For example, it is determined that VM 140*d-f* are low on storage allocation. Therefore, in response to detecting that the VM 140*d-f* are low on storage allocation, a message is automatically sent to a load balancer member to allocate additional memory to VM 140*d-f*. Also, the result of the allocation of additional memory is posted to Socialcast®.

At procedure 722, in response to a change of the virtualization infrastructure, automatically send the message comprising the command. For example, it is determined that another VM is added to cluster 135. Accordingly, a message is automatically sent to a load balancer member that allocates resources to the new VM in cluster 135 and/or adjusts the resource allocation of the existing VMs accordingly.

At procedure 723, a private message comprising a command is sent. For example, it is determined that VM 140*a* is no longer utilized. Accordingly, system administrator 105 sends a private message via Socialcast® to VM 140*a* to turn off.

At procedure 724, the message is broadcasted to some of the plurality of members of the virtualization infrastructure. For example, VMs in cluster 135 are functioning slowly. Accordingly, system administrator 105 broadcasts a message to the VMs of cluster 135 to generate a log file and send the log file back to the system administrator for subsequent analysis.

At procedure 725, a message is sent to a virtual machine of the virtualization infrastructure. For example, a message is sent to any one of the VMs of social network 300 via Socialcast®.

At procedure 726, the message is sent from an administrator of the virtualization infrastructure. For instance, a private message is sent from system administrator 105 to any one of the VMs on social network 300. The execution of the command in the private message facilitates in the administration and management of the virtualization infrastructure.

At procedure 727, a pre-generated message is sent to the first member of the virtualization infrastructure. For example, if a virtual machine has not been utilized for a pre-determined amount of time, then a pre-generated message that includes a command to turn off the VM is automatically sent to the un-used VM.

At procedure 810 of flow diagram 800, a message comprising a command is generated. For example, a system administrator receives a message that a VM functioning poorly. In response to the message, the system administrator generates a command to reset the VM.

At procedure 820, the message is sent to a first member of a virtualization infrastructure by a second member of the virtualization infrastructure over a social network. For example, system administrator 105 sends a private message to VM 140*a* to reset the VM because VM 140*a* was functioning poorly. The message is sent over social network 300.

At procedure 830, the message is received by the first member of the virtualization infrastructure. For instance, VM 140*a* receives the message containing a command to reset the VM. It should be appreciated that a message may be received by more than one member, such as a plurality of virtual machines.

At procedure 840, optionally, the command received by the first member of the virtualization infrastructure is validated. For example, an agent of VM 140*a* validates that the message is sent from a system administrator that has the requisite permission to send such messages.

At procedure 850, the command is executed by the first member of the virtualization infrastructure. For example, VM 140*a* executes the command to reset the VM. Accordingly, VM 140*a* is reset. It is noted that a plurality of members of the virtualization infrastructure are mapped to the social network, such that at least some of the members of the virtualization infrastructure are also members of the social network.

FIGS. 9, 10, 11, 13, 14 and 15 are flow diagrams 900, 1000, 1100, 1300, 1400, and 1500, respectively, of methods to facilitate administration of a virtualization infrastructure, according to various embodiments of the present invention. Although specific procedures are disclosed in flow diagrams, embodiments are well suited to performing various other procedures or variations of the procedures recited in flow diagrams. It is appreciated that the procedures in flow diagrams may be performed in an order different than presented, that not all of the procedures in flow diagrams may be performed, and that additional procedures to those illustrated and described may be performed. All of, or a portion of, the procedures described by flow diagrams can be implemented by a processor or computer system executing instructions which reside, for example, on computer-usable/readable media.

At procedure 910, operational conditions of members of the virtualization infrastructure are monitored. For example, VM 140a posts a message on Socialcast® about low CPU allocation. VM 140b also has a low CPU allocation and likes the message posted by VM 140a. Accordingly, the monitoring agent is able monitor the messages on Socialcast® that indicate the operational conditions of VM 140a and b.

At procedure 912, in one embodiment, messages are monitored, wherein the message are posted to a shared message stream of the social network by members of the social network associated with a member of the virtualization infrastructure. For example, VMs 140a-g which are members of social network 300 and virtualization infrastructure 100 post messages to the shared message stream of social network 300 that they are having poor connectivity with their respective hosts. Accordingly, the monitoring agent is able monitor the messages on Socialcast® that indicate the operational conditions of VM 140a-g.

At procedure 914, in another embodiment, operational conditions in a log file provided by one of the members of the social network are monitored. For example, virtualization management server 110 provides a log file indicating the duration of recent operations of members of the social network. In particular, the log file indicates the time to process the last ten operations of VMs 140a-g. Accordingly, the monitoring agent is able monitor operational conditions of VMs 140a-g via a provided log file.

At procedure 920, a group of members of the virtualization infrastructure within the social network is created based at least in part on the operational conditions. For example, VMs 140a-g post messages regarding low storage allocation on Socialcast®. The monitoring agent monitors and parses such messages and creates a group that includes VMs 140a-g based on their similar issues of low storage allocation.

At procedure 922, in one embodiment, creating a group of members of the virtualization infrastructure within the social network is created in response to monitoring a pre-determined number of the hash tags identifying the operational conditions. For example, if twenty comments or likes are provided for a particular operational condition associated with a hash tag, the monitoring agent creates a group of members associated with the comments. In such an example, a group was created that includes VMs 140a-c because VMs 140a-c made and liked twenty comments having a hash tag associated with low CPU allocation.

At procedure 924, in another embodiment, a group of members of the virtualization infrastructure of the social network having similar operational conditions is created. For example, VMs 140d-g are experiencing slow connectivity with datacenter 120b and post or like messages indicating the problem. The monitoring agent is able to access the messages and likes and creates a group that includes VMs 140d-g based on the similar operational conditions of slow connectivity with datacenter 120b.

At procedure 930, the group of members of the virtualization infrastructure based on a number of the hash tags identifying the operational conditions is prioritized. For instance, a first group of members is generated based on posted messages regarding low CPU allocation, and a second group of members is generated based on posted message regarding low memory allocation. The first group was generated from ten posted message having hash tags identifying the low CPU allocation, while the second group was generated from five posted messages having hash tags identifying the low memory allocation. Accordingly, the first group is prioritized over the second group. As a result, a private message may be sent to the system administrator indicating the creation of the first group before a private message is sent indicating the creation of the second group because of the higher priority of the first group.

At procedure 940, visibility of the group of members of the virtualization infrastructure based on popularity of the hash tags for particular operational conditions is increased. For instance, a first group of members is generated based on posted messages regarding poor connectivity with a host, and a second group of members is generated based on posted message regarding low CPU allocation. The first group was generated from ten posted message having hash tags identifying the poor connectivity with a combined twenty likes, while the second group was generated from ten posted messages having hash tags identifying the low CPU allocation with a combined ten likes. Accordingly, the visibility of the first group of members is increased. As a result, a private message may be sent to the system administrator indicating the creation of the first group before a private message is sent indicating the creation of the second group because of the higher priority of the first group.

At procedure 950, a private message is sent to a system administrator indicating the creation of the group of members of the virtualization infrastructure. For example, in response to a group being created, the monitoring agent sends a private message over Socialcast® to the system administrator indicating that a group has been created wherein the group members have a common problem.

Figure 10:
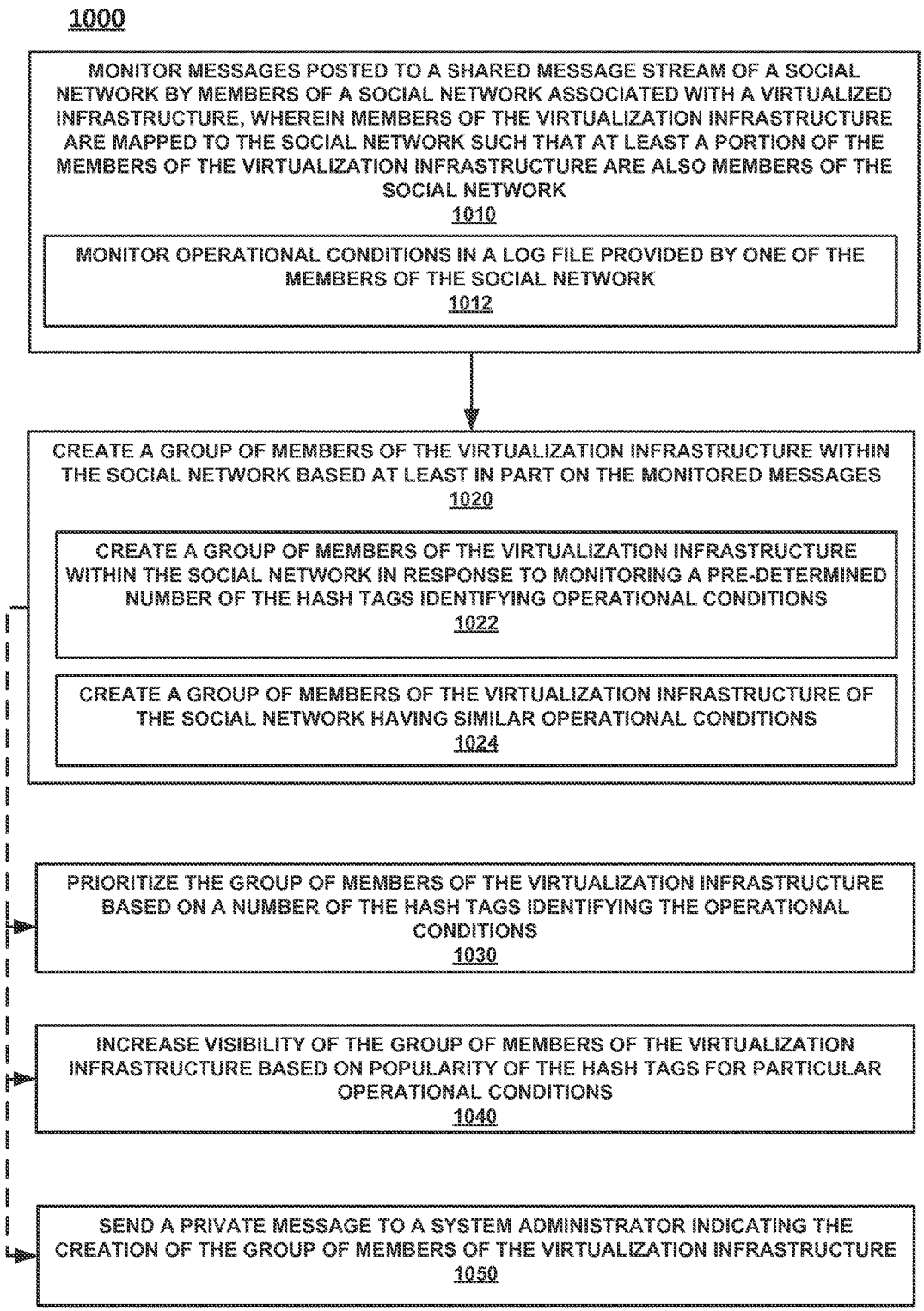

Referring to FIG. 10, at procedure 1010, messages posted to a shared message stream of a social network by members of a social network associated with a virtualized infrastructure are monitored. For example, host 130a posts a message on Socialcast® indicating that it cannot connect with VMs 140a-b. Host 130b sees the message on Socialcast® and likes the message because host 130b cannot connect with VM 140c. The external monitoring agent is able to monitor the message posted by host 130a and liked by host 130b.

It is noted that members of the virtualization infrastructure are mapped to the social network such that at least a portion of the members of the virtualization infrastructure are also members of the social network At procedure 1012, in one embodiment, operational conditions in a log file provided by one of the members of the social network are monitored. For example, virtualization management server 110 provides a log file indicating the duration of recent operations of members of the social network. In particular, the log file indicates the time to process the most recent operations of VMs 140a-g. Accordingly, the monitoring agent is able monitor operational conditions of VMs 140*a*-*g* via a provided log file.

At procedure 1020, a group of members of the virtualization infrastructure within the social network based at least in part on the monitored messages is created. For example, VMs 140*a*-*g* post messages regarding low storage allocation on Socialcast®. The monitoring agent monitors and parses such messages and creates a group that includes VMs 140*a*-*g* based on their similar issues of low storage allocation.

At procedure 1022, in one embodiment, a group of members of the virtualization infrastructure within the social network is created in response to monitoring a pre-determined number of the hash tags identifying the operational conditions. For example, if five comments or likes are provided for a particular operational condition associated with a hash tag, the monitoring agent creates a group of members associated with the comments. In such an example, a group was created that includes VMs 140*a*-*c* because VMs 140*a*-*c* made and liked five comments having a hash tag associated with poor connectivity with their respective host.

At procedure 1024, in another embodiment, creating a group of members of the virtualization infrastructure of the social network having similar operational conditions. For example, VMs 140*d*-*g* are experiencing slow connectivity with datacenter 120*b* and post or like messages indicating the problem. The monitoring agent is able to access the messages and likes and creates a group that includes VMs 140*d*-*g* based on the similar operational conditions of slow connectivity with datacenter 120*b*.

At procedure 1030, the group of members of the virtualization infrastructure based on a number of the hash tags identifying the operational conditions are prioritized. For instance, a first group of members is generated based on posted messages regarding low CPU allocation, and a second group of members is generated based on posted message regarding low memory allocation. The first group was generated from ten posted message having hash tags identifying the low CPU allocation, while the second group was generated from five posted messages having hash tags identifying the low memory allocation. Accordingly, the first group is prioritized over the second group.

At procedure 1040, visibility of the group of members of the virtualization infrastructure based on popularity of the hash tags for particular operational conditions is increased. For instance, a first group of members is generated based on posted messages regarding poor connectivity with a host, and a second group of members is generated based on posted message regarding low CPU allocation. The first group was generated from ten posted message having hash tags identifying the poor connectivity with a combined twenty likes, while the second group was generated from ten posted messages having hash tags identifying the low CPU allocation with a combined ten likes. Accordingly, the visibility of the first group of members is increased. As a result, a private message may be sent to the system administrator indicating the creation of the first group before a private message is sent indicating the creation of the second group because of the higher priority of the first group.

At procedure 1050, sending a private message to a system administrator indicating the creation of the group of members of the virtualization infrastructure. For example, in response to a group being created, the monitoring agent sends a private message over Socialcast® to the system administrator indicating that a group has been created wherein the group members have a common problem.

At procedure 1110, monitoring messages posted to a shared message stream of a social network by members of the social network associated with a virtualization infrastructure, wherein the posted messages comprise hash tags identifying operational conditions of the members of the virtualization infrastructure. For example, VM 140*a* posts a message on Socialcast® about low CPU allocation. VM 140*b* also has a low CPU allocation and likes the message posted by VM 140*a*. Accordingly, the monitoring agent is able monitor the messages on Socialcast® that indicate the operational conditions of VM 140*a* and *b*. Additionally, the message posted by VM 140*a* includes a hash tag identifying the operation condition, such as, "#low_CPU_allocation."

It is noted that members of the virtualization infrastructure are mapped to the social network such that at least a portion of the members of the virtualization infrastructure are also members of the social network At procedure 1112, in one embodiment, operational conditions in a log file provided by one of the members of the social network are monitored. For example, virtualization management server 110 provides a log file indicating the duration of recent operations of members of the social network. In particular, the log file indicates the time to process the last ten operations of VMs 140*a*-*g*. Accordingly, the monitoring agent is able monitor operational conditions of VMs 140*a*-*g* via a provided log file.

At procedure 1120, a group of members of the virtualization infrastructure within the social network are automatically created based at least in part on the operational conditions. For example, VMs 140*a*-*g* post messages regarding low storage allocation on Socialcast®. The monitoring agent monitors and parses such messages and automatically creates a group that includes VMs 140*a*-*g* based on their similar issues of low storage allocation.

At procedure 1130, a private message is sent to a system administrator indicating the creation of the group of members of the virtualization infrastructure. For example, in response to a group being created, the monitoring agent sends a private message over Socialcast® to the system administrator indicating that a group has been created wherein the group members have a common problem.

Figure 13:
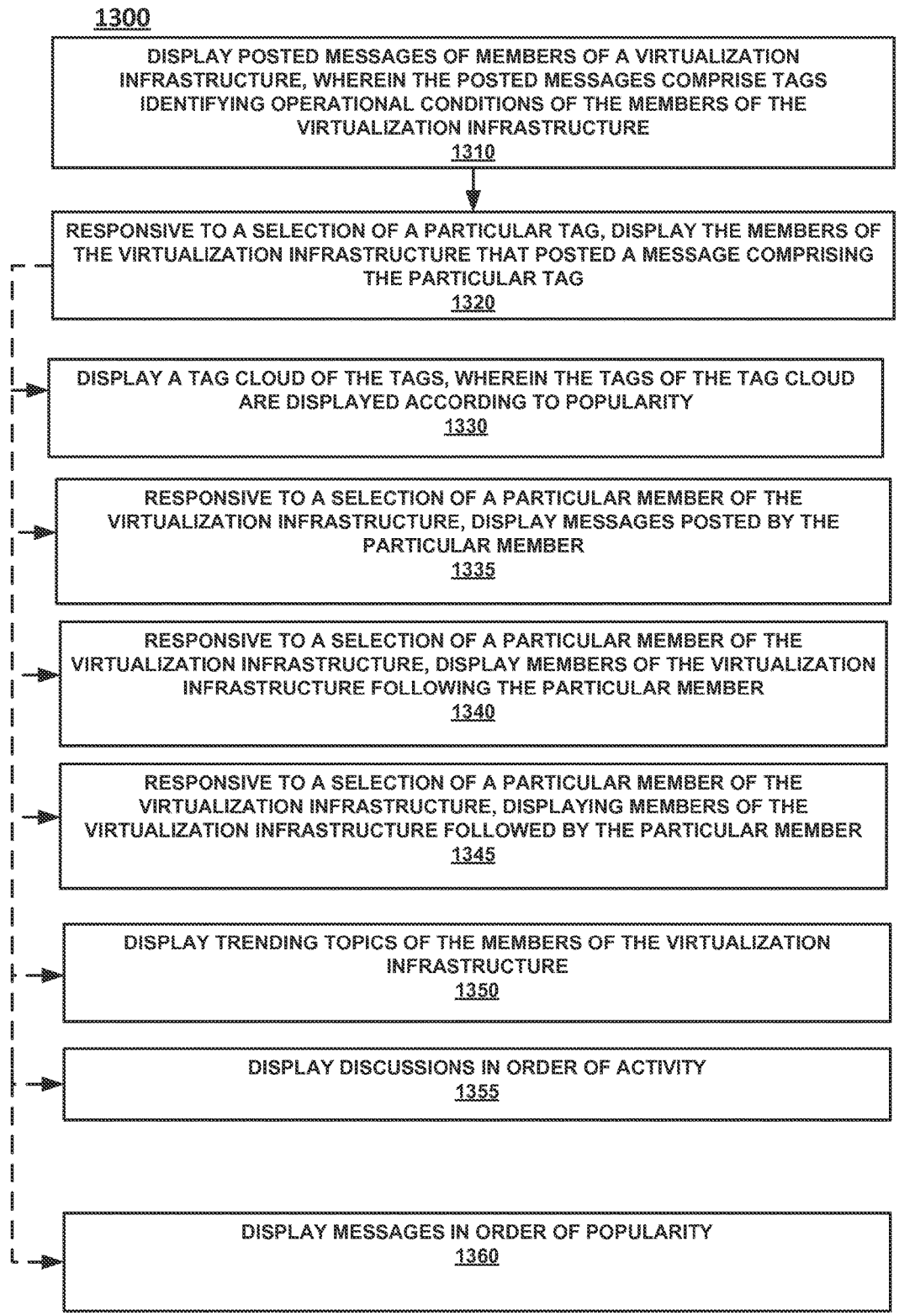

Referring to FIG. 13, at procedure 1310, messages posted by members of a virtualization infrastructure are displayed, wherein the posted messages comprise tags identifying operational conditions of the members of the virtualization infrastructure. For example, referring to FIG. 12A, members of social network 300 post messages via Socialcast® which are then display in message portion 1210A. Moreover, the displayed messages include a hash tag identifying operational conditions of the members.

At procedure 1320, responsive to a selection of a particular tag, the members of the virtualization infrastructure that posted a message comprising the particular tag are displayed. For example, referring to FIGS. 12A and B, a plurality of messages are displayed in message portion 1210A, responsive to selection of a particular tag in one of the messages (e.g., #low_memory_allocation), all of the members are then displayed in members portion 1210B that have posted a message, liked or commented on a message that included the particularly selected tag (e.g., #low_memory_allocation).

At procedure 1330, a tag cloud of the tags is displayed, wherein the tags of the tag cloud are displayed according to popularity. For example, tag cloud 1220A depicts trending topics in the last 7 days. That is, tag cloud 1220A, in one embodiment, lists tagged comments in order of popularity, with the most popular being listed on top.

At procedure 1335, responsive to a selection of a particular member of the virtualization infrastructure, messages posted by the particular member are displayed. For example, referring to FIGS. 12B and C, in response to selecting a member (e.g., VM 140a) that is listed in members portion 1210B, message posted (or liked or commented on) by the selected member are posted in message portion 1210C.

At procedure 1340, responsive to a selection of a particular member of the virtualization infrastructure, members of the virtualization infrastructure following the particular member are displayed. For example, referring to FIGS. 12B and C, in response to selecting a member (e.g., VM 140a) that is listed in members portion 1210B, followers 1230C of the selected member are displayed.

At procedure 1345, responsive to a selection of a particular member of the virtualization infrastructure, members of the virtualization infrastructure followed by the particular member are displayed. For example, in response to selecting a member (e.g., vcenter server) that is listed in members portion 1210B, members of the social network followed by the selected member are displayed (e.g., displayed in following portion 1232D).

At procedure 1350, trending topics of the members of the virtualization infrastructure are displayed. For example, members of social network 300 post messages on the shared message stream. The trending topics based on, for example, popularity, importance, are listed in tag cloud 1220A.

At procedure 1355, display discussions in order of activity. For example, messages posted by members of social network 300 are listed in order of activity in message portion 1210A.

At procedure 1360, display messages in order of popularity. For instance, messages posted in the shared message stream which are the most popular (e.g., most comments, most likes, etc.) are listed on top of tag cloud 1220A.

Figure 14:

Referring to FIG. 14, at procedure 1410, display posted messages of members of a virtualization infrastructure, wherein the posted messages comprise tags identifying operational conditions of the members of the virtualization infrastructure. For example, referring to FIG. 12A, members of social network 300 post messages via Socialcast® which are then display in message portion 1210A. Moreover, the displayed messages include a hash tag identifying operational conditions of the members.

At procedure 1420, responsive to a selection of a particular tag, display the members of the virtualization infrastructure that posted a message comprising the particular tag. For example, referring to FIGS. 12A and B, a plurality of messages are displayed in message portion 1210A, responsive to selection of a particular tag in one of the messages, all of the members are then displayed in members portion 1210B that have posted a message, liked or commented on a message that included the particularly selected tag.

At procedure 1430, display a tag cloud of the tags, wherein the tags of the tag cloud are displayed according to popularity. For example, tag cloud 1220A depicts trending topics. That is, tag cloud 1220A, in one embodiment, lists tagged comments in order of popularity, with the most popular activities listed on top.

At procedure 1435, responsive to a selection of a particular member of the virtualization infrastructure, display messages posted by the particular member. For example, referring to FIGS. 12B and C, in response to selecting a member (e.g., VM 140f) that is listed in members portion 1210B, message posted (or liked or commented on) by the selected member are posted in message portion 1210C.

At procedure 1440, responsive to a selection of a particular member of the virtualization infrastructure, display members of the virtualization infrastructure following the particular member. For example, referring to FIGS. 12B and C, in response to selecting a member (e.g., VM 140f) that is listed in members portion 1210B, followers 1230C (e.g. VM 140a) of the selected member are displayed.

At procedure 1445, responsive to a selection of a particular member of the virtualization infrastructure, displaying members of the virtualization infrastructure followed by the particular member. For example, in response to selecting a member (e.g., VM 140a) that is listed in members portion 1210B, members of the social network followed by the selected member (e.g., VM 140b-e) are displayed.

At procedure 1450, display trending topics of the members of the virtualization infrastructure. For example, members of social network 300 post messages on the shared message stream. The trending topics based on, for example, popularity, importance, are listed in tag cloud 1220A.

At procedure 1455, display discussions in order of activity. For example, messages posted by members of social network 300 are listed in order of activity in message portion 1210A.

At procedure 1460, display messages in order of popularity. For instance, messages posted in the shared message stream which are the most popular (e.g., most comments, most likes, etc.) are listed on top of tag cloud 1220A.

Referring to FIG. 15, at procedure 1510, display messages posted to a shared message stream of a social network by members of the social network associated with a virtualization infrastructure, wherein the messages comprise hash tags identifying operational conditions of the members of the social network. For example, referring to FIG. 12A, members of social network 300 post messages via Socialcast® which are then display in message portion 1210A. Moreover, the displayed messages include a hash tag identifying operational conditions of the members, such as, but not limited to, resource allocation, resource usage, etc.

It is noted that members of the virtualization infrastructure are mapped to the social network such that at least a portion of the members of the virtualization infrastructure are also members of the social network At procedure 1520, responsive to a selection of a particular hash tag, display the members of the virtualization infrastructure that posted a message comprising the particular hash tag. For example, a plurality of messages are displayed in message portion 1210A, responsive to selection of a particular tag in one of the messages, all of the members are then displayed in members portion 1210B that have posted a message, liked or commented on a message that included the particularly selected tag.

At procedure 1530, display a tag cloud of the hash tags, wherein the hash tags of the tag cloud are displayed according to popularity. For example, tag cloud 1220A depicts trending topics. That is, tag cloud 1220A, in one embodiment, lists tagged comments in order of popularity, with the most popular activities listed on top.

At procedure 1540, responsive to a selection of a particular member of the social network, display all messages posted by the particular member. For example, in response to selecting a member (e.g., VM 140a) that is listed in members portion 1210B, all of the message posted (or liked or commented on) by the selected member are posted in message portion 1210C.

Figure 16B:
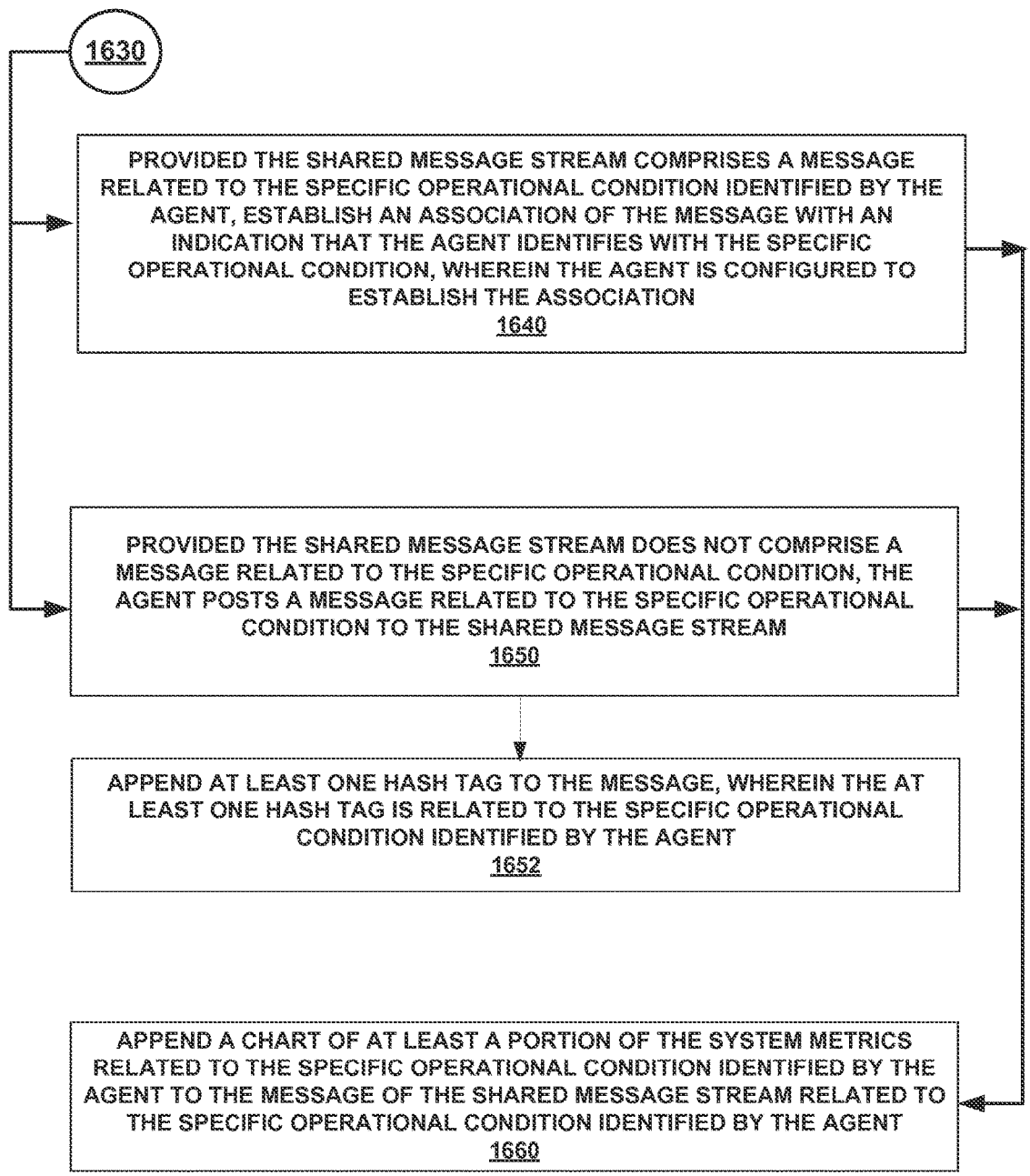

FIGS. 16A and 16B are a flow diagram 1600 of a method for facilitating administration of a member of a network, according to various embodiments of the present invention.

Although specific procedures are disclosed in flow diagram 1600, embodiments are well suited to performing various other procedures or variations of the procedures recited in flow diagram 1600. It is appreciated that the procedures in flow diagram 1600 may be performed in an order different than presented, that not all of the procedures in flow diagram 1600 may be performed, and that additional procedures to those illustrated and described may be performed. All of, or a portion of, the procedures described by flow diagram 1600 can be implemented by a processor or computer system executing instructions which reside, for example, on computer-usable/readable media.

At procedure 1620, performance of a member of a network is monitored by an agent. In one embodiment, the agent is installed on the member. In another embodiment, the agent is configured to remotely monitor the member over the network. Members of the network are provided with access to a shared message stream such that the members of the network are able to monitor messages generated by other members of the network posted to the shared message stream. At least some of the messages are indicative of operational conditions of particular other members which generated the messages.

In one embodiment, the network includes a virtualization infrastructure mapped to a social network. In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts. In one embodiment, the social network supports the shared message stream.

In one embodiment, procedure 1620 includes procedures 1622, 1624 and 1626. At procedure 1622, system metrics of the member are checked by the agent. At procedure 1624, it is determined whether the system metrics are within a desired performance range. In one embodiment, if the system metrics are not within a desired range, enhanced monitoring of the member is initiated. For example, if a member's processing usage has exceeded a given threshold, the polling frequency of the processing usage is increased for a period to gather more information about the processing usage (e.g., to determine whether the increase processing usage is the result of a short term spike or is indicative of a larger problem). At procedure 1626, a history of the system metrics of the member is stored by the agent.

At procedure 1630, responsive to the agent identifying a specific operational condition of the member, the agent monitors the shared message stream for a message related to the specific operational condition. In one embodiment, procedure 1630 includes procedures 1632 and 1634. At procedure 1632, with respect to a specific message monitored at the member, a relevance of the indicated operational condition of the specific message to the member is determined by the agent. The relevance is based on compatibility of the indicated operational condition to the specific operational condition. As shown at procedure 1634, in response to determining that there is compatibility of the indicated operational condition to the specific operational condition, it is determined that the specific message is related to the specific operational condition. In one embodiment, the messages include a group identifier and a hash tag providing information related to the operational condition. It should be appreciated that responsive to a request for the information provided by a particular hash tag, for example, by a system administrator, access to messages including the hash tag across the network can be provided.

For example, with reference to FIG. 3, VM 140*a* identifies a specific operational condition, e.g., it lost a connection to a particular server. An agent monitoring VM 140*a* will then monitor a shared message stream for a message indicating the same condition. It should be appreciated that the shared data stream can be for host 130*a* (VMs 140*a* and 140*b*), for group 320*a* (VMs 140*a*-*c*), or for any other combination of members. A message is scanned to determine whether it is related to the specific operational condition.

With reference to FIG. 16B, at procedure 1640, provided the shared message stream includes a message related to the specific operational condition identified by the agent, an association of the message with an indication that the agent identifies with the specific operational condition is established, e.g., the agent indicates that the member "likes" the message. In one embodiment, the agent is configured to establish the association.

At procedure 1650, provided the shared message stream does not include a message related to the specific operational condition, the agent posts a message related to the specific operational condition to the shared message stream. This message is available in the shared message stream for monitoring by other agents and/or members, and can receive associations. In one embodiment, as shown at procedure 1652, the agent appends at least one hash tag to the message, wherein the at least one hash tag is related to the specific operational condition identified by the agent.

In one embodiment, as shown at procedure 1660, the agent appends a chart of at least a portion of the system metrics related to the specific operational condition identified by the agent to the message of the shared message stream related to the specific operational condition identified by the agent. In one embodiment, the chart is appended to an existing message of the shared message stream for which the association has been established (e.g., the message of procedure 1640). In another embodiment, the chart is appended to a new message posted by the agent (e.g., the message of procedure 1650).

Example Host Computing System

Figure 17:
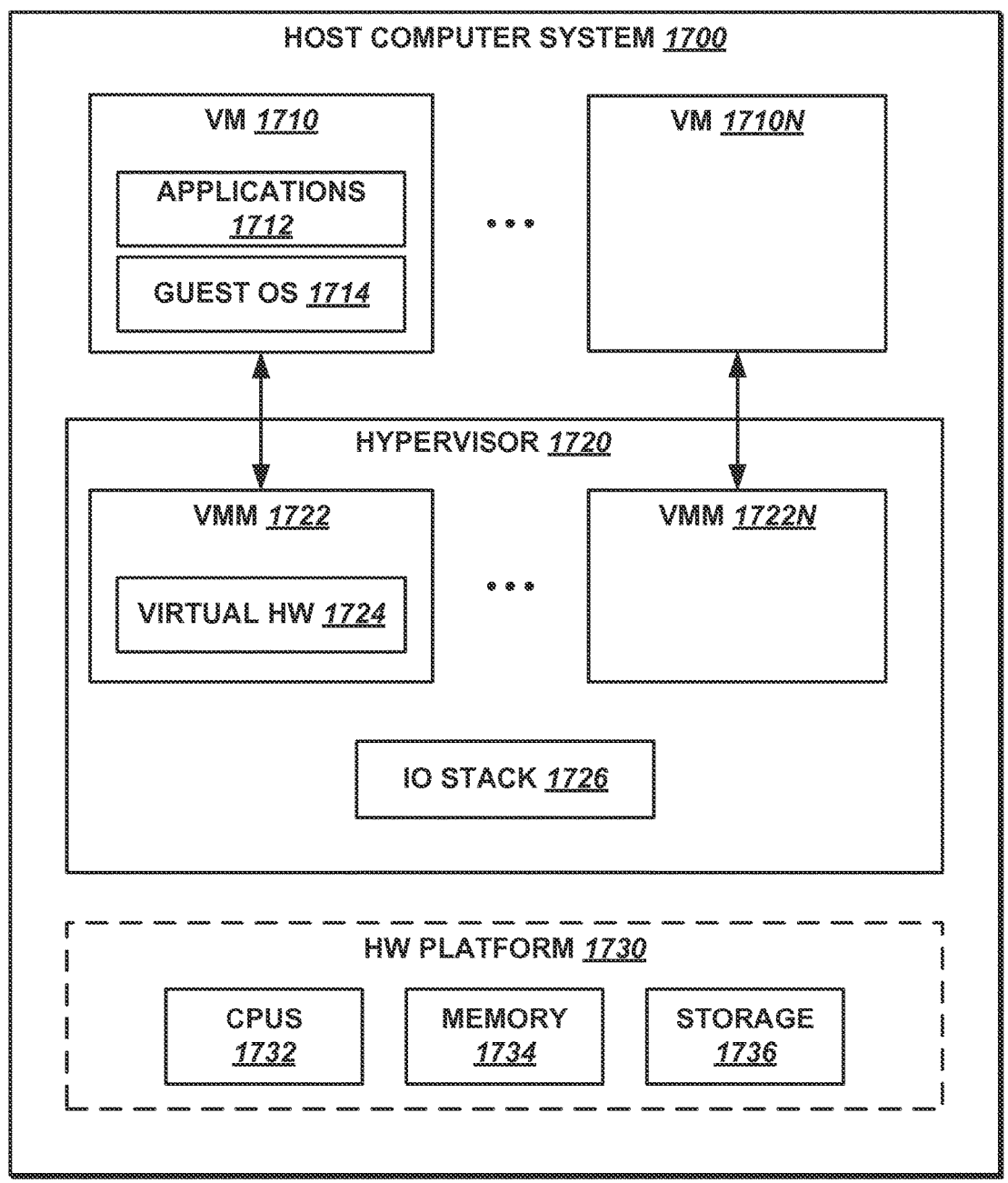
FIG. 17 illustrates an example host computing system, according to various embodiments of the present invention.

FIG. 17 is a schematic diagram that illustrates a virtualized computer system that is configured to carry out one or more embodiments of the present invention. The virtualized computer system is implemented in a host computer system 1700 including hardware platform 1730. In one embodiment, host computer system 1700 is constructed on a conventional, typically server-class, hardware platform.

Hardware platform 1730 includes one or more central processing units (CPUs) 1732, system memory 1734, and storage 1736. Hardware platform 1730 may also include one or more network interface controllers (NICs) that connect host computer system 1700 to a network, and one or more host bus adapters (HBAs) that connect host computer system 1700 to a persistent storage unit.

Hypervisor 1720 is installed on top of hardware platform 1730 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 1724 for virtual machine 1710 supports the installation of guest OS 1714 which is capable of executing applications 1712 within virtual machine 1710.

Guest OS 1714 may be any of the well-known commodity operating systems, such as Microsoft Windows™, Linux™, and the like, and includes a native file system layer, for example, either an NTFS or an ext3FS type file system layer. IOs issued by guest OS 1714 through the native file system layer appear to guest OS 1716 as being routed to one or more virtual disks provisioned for virtual machine 1710 for final execution, but such IOs are, in reality, are reprocessed by IO stack 1726 of hypervisor 1720 and the reprocessed IOs are issued, for example, through an HBA to a storage system.

Virtual machine monitor (VMM) 1722 and 1722n may be considered separate virtualization components between the virtual machines and hypervisor 1720 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method to facilitate administration of a virtualization infrastructure, the computer-implemented method comprising:

providing members of the virtualization infrastructure with access to a shared message stream of a social network such that the members of the virtualization infrastructure are able to monitor messages generated by other members of the virtualization infrastructure posted to the shared message stream, wherein at least some of the messages are indicative of operational conditions of particular other members which generated the messages, wherein the members of the virtualization infrastructure comprise: a system administrator, a virtualization management server, a plurality of hosts, and a plurality of virtual machines, and wherein the members of the social network are arranged in a hierarchy such that the system administrator follows the virtualization management server, and the virtualization management server follows at least one of the hosts;

responsive to a first non-human member of the virtualization infrastructure identifying a specific operational condition of the first non-human member, monitoring the shared message stream for a message related to the specific operational condition;

provided the shared message stream comprises a message related to the specific operational condition identified by the first non-human member, establishing an association of the message with an indication that the first non-human member identifies with the specific operational condition, wherein the first non-human member is configured to establish the association;

displaying posted messages of non-human members of the virtualization infrastructure, the non-human members comprising the plurality of virtual machines, wherein the posted messages comprise tags identifying operational conditions of the non-human members of the virtualization infrastructure, wherein the operational conditions comprise the specific operational condition identified by the first non-human member; and responsive to a selection of a particular tag, displaying the non-human members of the virtualization infrastructure that posted a message comprising the particular tag and displaying the non-human members established an association with a message comprising the particular tag.

2. The computer-implemented method of claim 1, further comprising:

displaying a tag cloud of the tags, wherein the tags of the tag cloud are displayed according to popularity.

3. The computer-implemented method of claim 1, further comprising:

responsive to a selection of a particular member of the virtualization infrastructure, displaying messages posted by the particular member.

4. The computer-implemented method of claim 3, further comprising:

displaying a tag cloud of tags associated with the particular member, wherein the tags of the tag cloud are displayed according to popularity.

5. The computer-implemented method of claim 4, wherein the tag cloud comprises hash tags identifying the operational conditions of the selected particular member.

6. The computer-implemented method of claim 1, further comprising:

responsive to a selection of a particular member of the virtualization infrastructure, displaying members of the virtualization infrastructure following the particular member.

7. The computer-implemented method of claim 1, further comprising:

responsive to a selection of a particular member of the virtualization infrastructure, displaying members of the virtualization infrastructure followed by the particular member.

8. The computer-implemented method of claim 1, further comprising:

displaying trending topics of the members of the virtualization infrastructure.

9. The computer-implemented method of claim 1, further comprising:

displaying discussions in order of activity.

10. The computer-implemented method of claim 1, further comprising:

displaying messages in order of popularity.

11. The computer-implemented method of claim 1, wherein the members of the virtualization infrastructure are mapped to a social network such that at least a portion of the members of the virtualization infrastructure are also members of the social network.

12. A non-transitory computer-readable storage medium having instructions embodied therein that when executed cause a computer system to perform a method to facilitate administration of a virtualization infrastructure, the method comprising:

providing members of the virtualization infrastructure with access to a shared message stream of a social network such that the members of the virtualization infrastructure are able to monitor messages generated by other members of the virtualization infrastructure posted to the shared message stream, wherein at least some of the messages are indicative of operational conditions of particular other members which generated the messages, wherein the members of the virtualization infrastructure comprise: a system administrator, a virtualization management server, a plurality of hosts, and a plurality of virtual machines, and wherein the members of the social network are arranged in a hierarchy such that the system administrator follows the virtualization management server, and the virtualization management server follows at least one of the hosts;

responsive to a first non-human member of the virtualization infrastructure identifying a specific operational condition of the first non-human member, monitoring the shared message stream for a message related to the specific operational condition;

provided the shared message stream comprises a message related to the specific operational condition identified by the first non-human member, establishing an association of the message with an indication that the first non-human member identifies with the specific operational condition, wherein the first non-human member is configured to establish the association;

displaying messages posted to the shared message stream by non-human members of the social network associated with the virtualization infrastructure, the non-human members comprising the plurality of virtual machines, wherein the messages comprise tags identifying operational conditions of the non-human members of the social network, wherein the operational conditions comprise the specific operational condition identified by the first non-human member, wherein the non-human members of the virtualization infrastructure are mapped to the social network such that at least a portion of the non-human members of the virtualization infrastructure are also members of the social network; and responsive to a selection of a particular tag, displaying the non-human members of the virtualization infrastructure that posted a message comprising the particular tag and displaying the non-human members established an association with a message comprising the particular tag.

13. The non-transitory computer-readable storage medium of claim 12, the method further comprising:
displaying a tag cloud of the tags, wherein the tags of the tag cloud are displayed according to popularity.

14. The non-transitory computer-readable storage medium of claim 12, the method further comprising:
responsive to a selection of a particular member of the social network, displaying messages posted by the particular member.

15. The non-transitory computer-readable storage medium of claim 14, the method further comprising:
displaying a tag cloud of tags associated with the particular member, wherein the tags of the tag cloud are displayed according to popularity.

16. The non-transitory computer-readable storage medium of claim 12, the method further comprising:
responsive to a selection of a particular member of the social network, displaying members of the social network following the particular member.

17. The non-transitory computer-readable storage medium of claim 12, the method further comprising:
responsive to a selection of a particular member of the social network, displaying members of the social network followed by the particular member.

18. A computer-implemented method to facilitate administration of a virtualization infrastructure, the computer-implemented method comprising:
providing members of the virtualization infrastructure with access to a shared message stream of a social network such that the members of the virtualization infrastructure are able to monitor messages generated by other members of the virtualization infrastructure posted to the shared message stream, wherein at least some of the messages are indicative of operational conditions of particular other members which generated the messages, wherein the members of the virtualization infrastructure comprise: a system administrator, a virtualization management server, a plurality of hosts, and a plurality of virtual machines, and wherein the members of the social network are arranged in a hierarchy such that the system administrator follows the virtualization management server, and the virtualization management server follows at least one of the hosts;

responsive to a first non-human member of the virtualization infrastructure identifying a specific operational condition of the first non-human member, monitoring the shared message stream for a message related to the specific operational condition;

provided the shared message stream comprises a message related to the specific operational condition identified by the first non-human member, establishing an association of the message with an indication that the first non-human member identifies with the specific operational condition, wherein the first non-human member is configured to establish the association;

displaying messages posted to the shared message stream by non-human members of the social network associated with the virtualization infrastructure, the non-human members comprising the plurality of virtual machines, wherein the messages comprise hash tags identifying operational conditions of the non-human members of the social network, wherein the operational conditions comprise the specific operational condition identified by the first non-human member, wherein the non-human members of the virtualization infrastructure are mapped to the social network such that at least a portion of the non-human members of the virtualization infrastructure are also members of the social network;

responsive to a selection of a particular hash tag, displaying the non-human members of the virtualization infrastructure that posted a message comprising the particular hash tag and displaying the non-human members established an association with a message comprising the particular tag; and displaying a tag cloud of the hash tags, wherein the hash tags of the tag cloud are displayed according to popularity.

19. The computer-implemented method of claim 18, the method further comprising:
responsive to a selection of a particular member of the social network, displaying all messages posted by the particular member.

* * * * *